(12) United States Patent
Mori

(10) Patent No.: US 7,440,035 B2
(45) Date of Patent: Oct. 21, 2008

(54) CABLE EXTENDING DEVICE

(75) Inventor: Masafumi Mori, Tokyo (JP)

(73) Assignee: Kowa Company, Ltd., Nagoya-shi, Aichi (JP)

( * ) Notice: Subject to any disclaimer, the term of this patent is extended or adjusted under 35 U.S.C. 154(b) by 558 days.

(21) Appl. No.: 10/558,524

(22) PCT Filed: Jul. 6, 2004

(86) PCT No.: PCT/JP2004/009553

§ 371 (c)(1),
(2), (4) Date: Nov. 28, 2005

(87) PCT Pub. No.: WO2005/006744

PCT Pub. Date: Jan. 20, 2005

(65) Prior Publication Data

US 2006/0234546 A1   Oct. 19, 2006

(30) Foreign Application Priority Data

Jul. 10, 2003 (JP) .............................. 2003-194921

(51) Int. Cl.
*H04N 9/475* (2006.01)
*H04N 5/00* (2006.01)

(52) U.S. Cl. .................... 348/518; 348/607; 348/613; 333/15; 333/18; 375/230

(58) Field of Classification Search ............. 348/609, 348/518, 613, 607, 723–726; 333/17.2, 17.3, 333/18; 375/229, 230, 231; 381/103
See application file for complete search history.

(56) References Cited

U.S. PATENT DOCUMENTS

| | | | |
|---|---|---|---|
| 4,151,490 A * | 4/1979 | Bazin ........................... | 333/16 |
| 4,984,079 A * | 1/1991 | Ho et al. ....................... | 348/707 |
| 5,146,332 A | 9/1992 | Hara et al. | |
| 6,838,943 B2 * | 1/2005 | Zamir et al. ................... | 330/304 |

FOREIGN PATENT DOCUMENTS

| | | |
|---|---|---|
| JP | 3096076 | 4/1991 |
| JP | 4108272 | 4/1992 |
| JP | 5167986 | 7/1993 |
| JP | 9232894 | 9/1997 |

* cited by examiner

*Primary Examiner*—M. Lee
(74) *Attorney, Agent, or Firm*—Duane Morris LLP

(57) ABSTRACT

Attenuation compensation volume computing means (60, 61, 62, 63, 67, 68, 69, 70) of a signal receiver computes attenuation compensation volume of a video signal ($G_L$, $G_H$) on the basis of attenuation of pulses which are arranged in a digital sound signal $LR_D$ from the signal transmitter, and video signal attenuation compensation means (60, 61) of the signal receiver compensates the attenuation of the video signal ($R_{AT}$, $G_{AT}$, $B_{AT}$) on the basis of the computed attenuation compensation volume ($G_L$, $G_H$), thereby stably compensating the attenuation of the video signal irrespective of kinds of displays or resolution of an image, and outputting good sounds to a video output machine as well as good videos.

6 Claims, 7 Drawing Sheets

(a)

(b)

(a)

(b)

(c)                (d)

CABLE EXTENDING DEVICE

TECHNICAL FIELD

This invention relates to a cable extension unit for displaying videos from a video input source on a video output machine which is away from the video input source. In particular, the invention relates to a cable extension unit for stably compensating video signals by utilizing digital sound signals as signals for compensation and for outputting good videos and sounds to the video output machine, thereby actualizing effective presentation.

BACKGROUND ART

Such kind of a conventional known cable extension unit can compensate attenuation of transmitted video signals by utilizing rectangular waves comprising horizontal and vertical synchronous signals corresponding to video signals as signals for compensation. Such cable extension unit can display good videos compensated on a video output machine which is arranged at a separate place with no complicated structure of the cable extension unit since it is not necessary to transmit signals for compensation separately from video signals, thereby actualizing effective presentation.

But, a rectangular wave the waveform of which is predetermined can not stably transmitted, and a video signal can not be correctly compensated since the rectangular wave comprising a horizontal or a vertical synchronous signal changes in its pulse width or a cycle, depending on resolution of an image or kinds of displays. In result, effective presentation may not be secured due to impossibility of stable compensation of video signals.

Since presentation can be made effective by outputting sounds, such as effective sounds and explanation of videos while displaying videos, the cable extension unit for outputting sounds to a video output machine as well as videos has been desired.

Then, the cable extension unit for stably compensating video signals by utilizing digital sound signals as signals for compensation, and for outputting good videos and sounds to a video output machine through which effective presentation can be actualized is desired to be developed.

DISCLOSURE OF INVENTION

One aspect of the invention is a cable extension unit (1) having a signal transmitter (2) for inputting video signals (e.g. color signals R, G, B) therein, and a signal receiver (3) being freely connecting with said signal transmitter (2) through signal lines (5A, 5B, 5C, 5D), for outputting said video signals (e.g. color signals R, G, B) received from said signal transmitter (2) through said signal lines (5A, 5B, 5C, 5D), comprising:

said signal transmitter (2) comprising:

sound signal receiving means (41) for receiving input of a sound signal ($L_A$, $R_A$); and digital sound signal transmitting means (41, 43) for outputting said sound signal ($L_A$, $R_A$) inputted into said sound signal receiving means (41) to said signal receiver (3) through said signal lines (5A, 5B, 5C, 5D) as a digital sound signal ($LR_D$) wherein pulses (PL) of digital data (DD) are arranged;

said signal receiver (3) comprising:

attenuation compensation volume computing means (60, 61, 62, 63, 67, 68, 69, 70) for computing attenuation compensation volume (e.g. $G_L$, $G_H$) of said video signal ($R_{AT}$, $G_{AT}$, $B_{AT}$) which receives from said signal transmitter (2) on the basis of attenuation of pulses (e.g. $PL_{AT}$) which are arranged in said digital sound signal (e.g. $LR_{AT}$) received from said signal transmitter (2); and video signal attenuation compensation means (60, 61) for compensating attenuation of said video signal ($R_{AT}$, $G_{AT}$, $B_{AT}$) received from said signal transmitter (2) on the basis of said attenuation compensation volume (e.g. $G_L$, $G_H$) computed by said attenuation compensation volume computing means (60, 61, 62, 63, 67, 68, 69, 70).

According to this aspect of the invention, the attenuation compensation volume (e.g. $G_L$, $G_H$) of a video signal is computed on the basis of the attenuation of the pulses ($PL_{AT}$) which are arranged in the digital sound signal ($LR_{AT}$), and the attenuation of the video signal ($R_{AT}$, $G_{AT}$, $B_{AT}$) is compensated on the basis of the computed attenuation compensation volume (e.g. $G_L$, $G_H$), so that the attenuation of the video signal ($R_{AT}$, $G_{AT}$, $B_{AT}$) can be compensated without utilizing horizontal and vertical synchronous signals corresponding to the video signal as the signals for compensation. Then, the attenuation of the video signal can be correctly compensated irrespective of resolution of an image or kinds of displays, thereby stably compensating the attenuation. Besides, the sound signal is outputted to the signal receiver (3), so that effective presentation can be actualized by outputting sound to a video output machine as well as good videos.

Besides, the number of the signal lines (5A, 5B, 5C, 5D) also capable of transmitting sound signals to the signal receiver (3) does not increase since it is not necessary to transmit signals for compensation, separate from video signals, thereby simplifying the structure of the cable extension unit (1).

And, another aspect of the invention is the cable extension unit, wherein said signal receiver (3) has frequency band separating means (65, 66) for separating said pulse (e.g. $PL_{AT}$) which is arranged in said digital sound signal (e.g. $LR_{AT}$) received from said signal transmitter (2) into a plurality of frequency bands (e.g. low frequency band and high frequency band), and said attenuation compensation volume computing means of said signal receiver (3) has means for computing compensation volume for each frequency band (60, 61, 62, 63, 67, 68, 69, 70) for computing said attenuation compensation volume ($G_L$, $G_H$) for each frequency band on the basis of said attenuation of each said pulse ($PL_{ATL}$, $PL_{ATH}$) which have been separated into a plurality of said frequency bands by said frequency band separating means (65, 66), and said video signal attenuation compensating means of said signal receiver (3) has means for compensating video signal for each frequency band (60, 61) for compensating said attenuation of said video signal ($R_{AT}$, $G_{AT}$, $B_{AT}$) which was received from said signal transmitter (2) for each said frequency band on the basis of said attenuation compensation volume ($G_L$, $G_H$) for each said frequency band which was computed by said means for computing compensation volume for each frequency band (60, 61, 62, 63, 67, 68, 69, 70).

According to this aspect of the invention, the attenuation of the video signal ($R_{AT}$, $G_{AT}$, $B_{AT}$) is compensated every frequency band (e.g. low frequency band and high frequency band), so that the attenuation of the video signal can be compensated according to attenuation factors which are different depending on frequencies. Therefore, the attenuation of the video signal can be accurately compensated, and better images can be displayed on a video output machine.

And, another aspect of the invention is the cable extension unit, wherein said pulses (PL) which are arranged in said digital sound signal ($LR_D$) which said digital sound signal transmitting means (41, 43) outputs are rectangular waves.

According to this aspect of the invention, the pulses (PL) which are arranged in the digital sound signal ($LR_D$) are rectangular waves, so that the digital sound signal ($LR_D$) including relatively wide bounds of frequency components can be outputted to the signal receiver (3). Then, almost frequency components which are included in a video signal can be entered into the distribution of the frequency components of the digital sound signal ($LR_D$). Therefore, the attenuation of the video signal ($R_{AT}$, $G_{AT}$, $B_{AT}$) can be compensated irrespective of the distribution of the frequencies of the video signal.

Besides, another aspect of the invention is the cable extension unit, wherein said signal transmitter (2) has digital sound signal converting means (45) for converting said digital sound signal ($LR_D$), which said digital sound signal transmitting means (41, 43) of said signal transmitter (2) outputs, into a digital modulation signal ($LR_{DM}$) wherein pulses ($PL_0$, $PL_1$) having frequencies (e.g. 1/T or 2/T as shown in FIG. 5(*b*)) corresponding to each digital data (DD) of said digital sound signal are arranged, and said digital sound signal transmitting means (41, 43) of said signal transmitter (2) outputs said digital modulation signal ($LR_{DM}$) to said signal receiver (3) through said signal lines (5A, 5B, 5C, 5D), and said attenuation compensation volume computing means (60, 61, 62, 63, 67, 68, 69, 70) of said signal receiver (3) computes said attenuation compensation volume (e.g. $G_L$, $G_H$) of said video signal ($R_{AT}$, $G_{AT}$, $B_{AT}$) received from said signal transmitter (2) on the basis of said attenuation of pulses ($PL_{ATL}$, $PL_{ATH}$) which are arranged in said digital modulation signal ($LR_{AT}$) received from said signal transmitter (2).

According to this aspect of the invention, the digital sound signal transmitting means (41, 43) outputs a digital modulation signal ($LR_{DM}$) wherein pulses ($PL_0$, $PL_1$) of frequencies corresponding to digital data (DD) are arranged to the signal receiver (3), so that periodic pulses can be outputted to the signal receiver (3) irrespective of the presence of the pulse (pl) of the digital sound signal ($LR_D$). Even if the digital sound signal ($LR_D$) has no pulse (PL) (if Low state continues), the attenuation compensation volume ($G_L$, $G_H$) can be computed on the basis of the attenuation of the periodic pulses, so that the attenuation of the video signals ($R_{AT}$, $G_{AT}$, $B_{AT}$) can be stably compensated.

Besides, another aspect of the invention is the cable extension unit, wherein said signal receiver (3) has frequency band separating means (65, 66) for separating said pulse ($PL_{AT}$) which is arranged in said digital modulation signal ($LR_{AT}$) received from said signal transmitter (2) into a plurality of frequency bands (e.g. low frequency band and high frequency band), and said attenuation compensation volume computing means of said signal receiver (3) has means for computing compensation volume for each frequency band (60, 61, 62, 63, 67, 68, 69, 70) for computing said attenuation compensation volume ($G_L$, $G_H$) for each frequency band on the basis of said attenuation of each said pulse ($PL_{ATL}$, $PL_{ATH}$) which have been separated into a plurality of said frequency bands by said frequency band separating means (65, 66), and said video signal attenuation compensating means of said signal receiver (3) has means for compensating video signal for each frequency band (60, 61) for compensating said attenuation of said video signal ($R_{AT}$, $G_{AT}$, $B_{AT}$) which was received from said signal transmitter (2) for each said frequency band on the basis of said attenuation compensation volume ($G_L$, $G_H$) for each said frequency band which was computed by said means for computing compensation volume for each frequency band (60, 61, 62, 63, 67, 68, 69, 70).

According to this aspect of the invention, the attenuation of the video signal ($R_{AT}$, $G_{AT}$, $B_{AT}$) is compensated every frequency band on the basis of the attenuation of the periodic pulses ($PL_0$, $PL_1$), so that the attenuation of the video signal ($R_{AT}$, $G_{AT}$, $B_{AT}$) can be stably correctly compensated, and better videos can be stably displayed on a video output machine.

Besides, another aspect of the invention is the cable extension unit, wherein said pulses ($PL_0$, $PL_1$) which are arranged in said digital modulation signal ($LR_{DM}$) which said digital sound signal transmitting means (41, 43) outputs are rectangular waves.

According to this aspect of the invention, the periodic pulse ($PL_0$, $PL_1$) is a rectangular wave, so that the attenuation of the video signal ($R_{AT}$, $G_{AT}$, $B_{AT}$) can be stably compensated irrespective of the distribution of the frequencies of the video signal.

The number in parentheses shows the corresponding element in the drawings for the sake of convenience in order to easily understand the invention, accordingly, the present descriptions are not restricted and bound by the descriptions on the drawings. Besides, the present invention should not be interpreted by these numbers.

EXPLANATION OF REFERENCE NUMBERS

Figure 1:
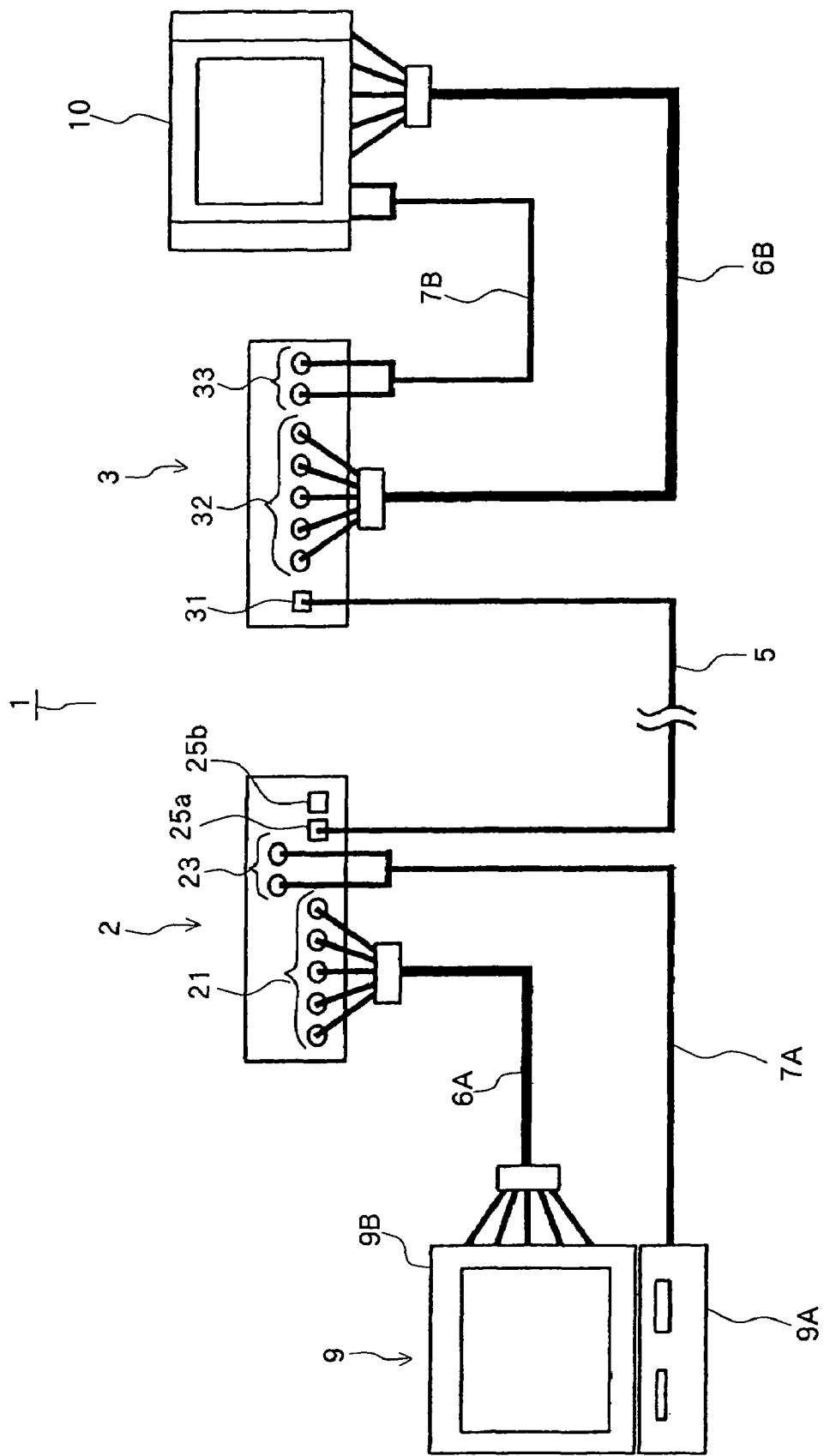
FIG. 1 is a view showing an appearance of a cable extension unit to which the invention is applied.

1 . . . cable extension unit
2 . . . signal transmitter
3 . . . signal receiver
5A, 5B, 5C, 5D . . . signal line
41 . . . sound signal receiving means, digital sound signal transmitting means (AD converting portion)
43 . . . digital sound signal transmitting means (data processing portion)
45 . . . digital sound signal converting means (modulating portion)
60 . . . attenuation compensation volume computing means, video signal attenuation compensation means, means for computing compensation volume for each frequency band, means for compensating video signal for each frequency band (low frequency compensation portion for video)

61 . . . attenuation compensation volume computing means, video signal attenuation compensation means, means for computing compensation volume for each frequency band, means for compensating video signal for each frequency band (high frequency compensation portion for video)

62 . . . attenuation compensation volume computing means, means for computing compensation volume for each frequency band (low frequency compensation portion for rectangular wave)

63 . . . attenuation compensation volume computing means, means for computing compensation volume for each frequency band (high frequency compensation portion for rectangular wave)

65 . . . frequency band separating means (low-pass filter)

66 . . . frequency band separating means (high-pass filter)

67 . . . attenuation compensation volume computing means, means for computing compensation volume for each frequency band (low frequency peak detecting portion 68 . . . attenuation compensation volume computing means, means for computing compensation volume for each frequency band (high frequency peak detecting portion 69 . . . attenuation compensation volume computing means, means for computing compensation volume for each frequency band (low frequency gain adjusting portion)

70 . . . attenuation compensation volume computing means, means for computing compensation volume for each frequency band (high frequency gain adjusting portion)

DD . . . digital data $G_L$, $G_H$ . . . attenuation compensation volume of video signal (low frequency gain, high frequency gain)

$L_A$, $R_A$ . . . sound signal (analog sound signal)

$LR_{AT}$ . . . digital sound signal received from signal transmitter, digital modulation signal received from signal transmitter (attenuation serial signal)

$LR_D$ . . . digital sound signal (serial sound signal)

$LR_{DM}$ . . . digital modulation signal (serial modulation signal)

$P_L$ . . . pulse of digital data $PL_{AT}$ . . . pulses which are arranged in digital sound signal received from signal transmitter, pulses which are arranged in digital modulation signal received from signal transmitter (attenuated pulses)

$PL_{ATL}$, $PLA_{TH}$ . . . pulse which is separated into a plurality of frequency bands, pulses which are arranged in digital modulation signal received from signal transmitter (low frequency attenuated pulses, high frequency attenuated pulses)

$PL_0$, $PL_1$ . . . pulse of frequency corresponding to digital data

R, G, B . . . video signal (R signal, G signal, B signal)

$R_{AT}$, $G_{AT}$, $B_{AT}$ . . . video signal received from signal transmitter (attenuation R signal, attenuation G signal, attenuation B signal)

BEST MODE FOR CARRYING OUT THE INVENTION

As shown in FIG. 1, a cable extension unit 1 has a signal transmitter 2 and a signal receiver 3, and the signal transmitter 2 can be connected with a cable through which video signals can be transmitted.

Video signals are RGB signals and component signals such as YPbPr signals and YCbCr signals (three signals comprised of a luminance signal and color difference signals). Cables for RGB signals are BNC (Bayonet Neill Concelman) cables each having a BNC connector (not shown) at each of both ends, and DSUB cables each having a DSUB connector (not shown) at each of both ends, and cables for component signals are BNC cables.

And, the signal transmitter 2 is freely connected with a cable through which sound signals can be transmitted. Sound signals are analog signals and digital signals. Analog signals are monaural signals and stereo signals. Cables for analog signals are RCA cables each having a RCA pin plug at each of both ends, for instance.

The signal transmitter 2 as shown in FIG. 1 is connected with a main body 9A of a personal computer 9 through a RCA cable 7A, and is connected with a display 9B of the personal computer 9 through a BNC cable 6A. A video input source is not specifically limited to the personal computer 9, but any unit is available as long as video signals, such as RGB signals, component signals, can be outputted thereby.

The signal transmitter 2 and the signal receiver 3 are respectively connected with a cable through which video signals and sound signals can be transmitted. Such cables are LAN cables each having a RJ-45 (Registered Jack-45) modular plug (not shown) at each of both ends, and the like. The LAN cable is a UTP (Unshield Twisted Pair) cable, for instance, which is comprised of four twisted pair lines, and the UTP cable is classified into divisions of Category 5 (CAT5) or Category 6 (CAT6) defined by 568 standard of EIA/TIA (Electronic Industries Alliance/Telecommunication Industries Association in the U.S.A.).

The signal transmitter 2 and the signal receiver 3 of FIG. 1 are connected with each other through a LAN cable 5. The LAN cable 5 has a predetermined cable length (one hundred meters, for instance). Then, the signal transmitter 2 and the signal receiver 3 which are connected with each other via the LAN cable 5 can be located so that one is the whole length of the cable away from the other.

Similar to the signal transmitter 2, the signal receiver 3 is freely connected with a cable for video signals, such as a BNC cable and a DSUB cable, or is freely connected with a cable for sound signals, such as a RCA cable.

The signal receiver 3 of FIG. 1 is connected with a plasma display 10 through a BNC cable 6B and a RCA cable 7B. A video output source is not specifically limited to the plasma display 10, but any unit is available as long as video signals, such as RGB signals, component signals, can be inputted and displayed thereby.

Figure 2:
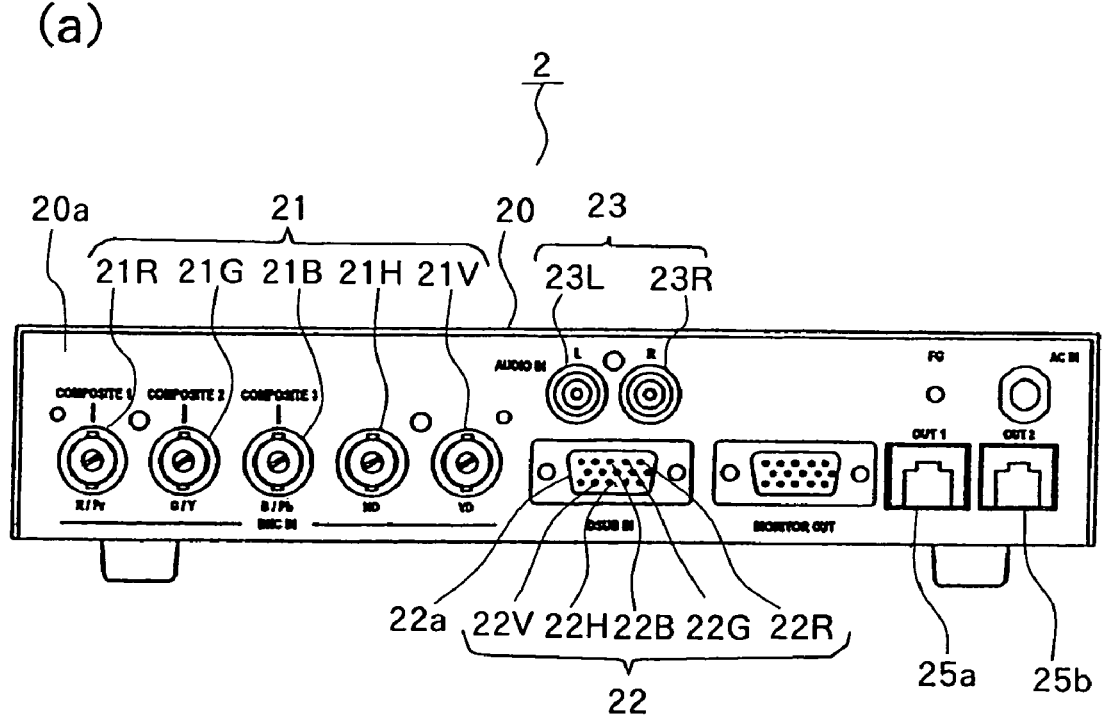
FIG. 2 is a view showing appearances of a signal transmitter and a signal receiver, wherein (a) is a rear view of the signal transmitter and (b) is a rear view of the signal receiver.
Figure 2:
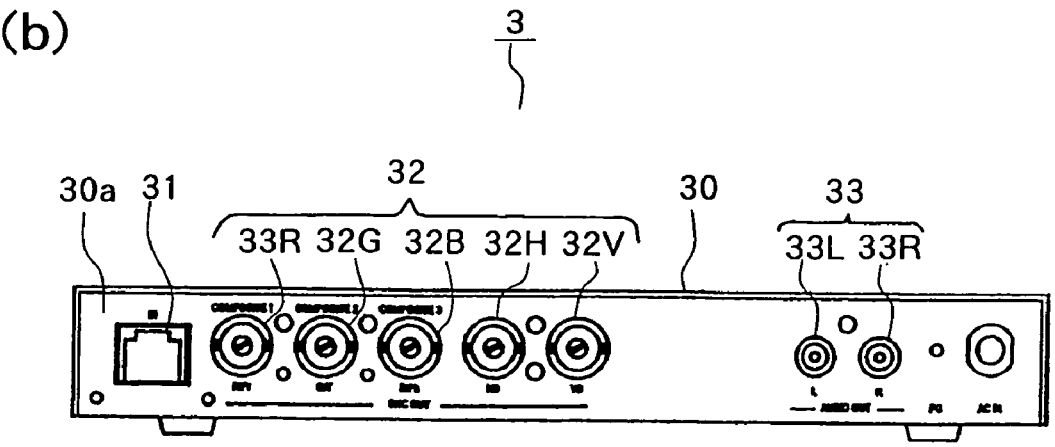

FIG. 2 is a view showing appearances of the signal transmitter 2 and the signal receiver 3, wherein (a) is a rear view of the signal transmitter 2 and (b) is a rear view of the signal receiver 3. As shown in FIG. 2(a), the signal transmitter 2 has a housing 20, and the housing 20 has a terminal board 20a. The terminal board 20a has an input terminal for BNC cable 21, an input terminal for DSUB cable 22, and an input terminal for sound signal 23 as input terminals, and output terminals for LAN cable 25a, 25b as output terminals.

The input terminal for BNC cable 21 is comprised of five input terminals for inputting RGB signals. In the concrete, the input terminal for BNC cable 21 has a R input terminal 21R, a G input terminal 21G, a B input terminal 21B respectively corresponding to a R (red) signal R, a G (green) signal G and a B (blue) signal B which are color signals comprising a RGB signal, and a HD input terminal 21H and a VD input terminal 21V respectively corresponding to a horizontal synchronous signal HD and a vertical synchronous signal VD of the RGB signal.

In the following explanation, the R signal R, the G signal G and the B signal B are referred to as only "the color signals R, G and B" and the horizontal synchronous signal HD and the vertical synchronous signal VD are as only "the synchronous signals HD and VD" if the distinctions are not specifically necessary.

A RGB signal can be inputted in the input terminal for DSUB cable 22, similar to the input terminal for BNC cable 21, and the input terminal for DSUB cable 22 is comprised of fifteen input pins 22R, 22G, 22B, 22H, 22V . . . arranged in three rows inside a shell 22a in the shape of "D" character, these input pins being female pins. Detailedly speaking, the input terminal for DSUB cable 22 has the R input pin 22R, the G input pin 22G and the B input pin 22B respectively corresponding to the R, G and B signals, and the HD input pin 22H and the VD input pin 22V respectively corresponding to the horizontal synchronous signal HD and the vertical synchronous signal VD.

Both the input terminal for BNC cable 21 and the input terminal for DSUB cable 22 function as input channels. That is, the signal transmitter 2 has two input channels. And, the signal transmitter 2 has selection switches (not shown) for the input channels on the front side thereof (the back side of FIG. 2). With such a structure, the signal transmitter 2 can output a video signal inputted through any of the input channels with the operation of an operator through the selection switch. The number of the input channels is not limited to two, but may be one, or three or more.

The sound signal input terminal 23 is a RCA pin jack for inputting an analog stereo signal ("the analog sound signals $L_A$, $R_A$" hereinafter), and has a left sound signal input terminal 23L corresponding to a left analog sound signal $L_A$ and a right sound signal input terminal 23R corresponding to a right analog sound signal $R_A$.

The output terminals for LAN cable 25a, 25b are the RJ-45 modular jacks, and has eight poles of contacts (not shown) corresponding to the modular plugs of the LAN cable 5.

As mentioned before, the LAN cable 5 has four twisted pair lines. Each twisted pair lines is comprised of two twisted signal lines for transmitting differential signals in parallel for noise reduction. Then, eight signal lines in total respectively correspond to the eight contacts.

In the following explanation, the respective twisted pair lines are regarded as one signal line, and the LAN cable 5 is regarded as a mixture of four signal lines 5A, 5B, 5C and 5D (see FIG. 3) in order to easily understand the invention. Only output contacts 25R, 25G, 25B and 25A (see a center of FIG. 3) respectively corresponding to the signal lines 5A, 5B, 5C and 5D will now be explained concerning the contacts of the output terminals for LAN cable 25a, 25b.

The signal transmitter 2 has distributing means (not shown) for distributing the video signal inputted in the input terminal for BNC cable 21 or in the input terminal for DSUB cable 22 and the sound signal inputted in the sound signal input terminal 23 to the output terminals for LAN cable 25a, 25b. The number of the output terminals for LAN cable 25a, 25b is not limited to two, but may be one, or three or more. Even if the number of the output terminals for LAN cable is changed, the distributing means can distribute the signals to each of the output terminals the number of which is changed.

And, the signal receiver 3 has a housing 30, similar to the signal transmitter 2, as shown in FIG. 2(b) and the housing 30 has a terminal board 30a. The terminal board 30a is provided with an input terminal for LAN cable 31 as an input terminal, and an output terminal for BNC cable 32 and a sound signal output terminal 33 as output terminals.

The input terminal for LAN cable 31 is a RJ-45 modular jack, the same as the output terminals for LAN cable 25a, 25b of the signal transmitter 2, and has eight contacts (not shown) corresponding to the modular plugs of the LAN cable 5. In the following descriptions, only input contacts 31R, 31G, 31B and 31A (see a center of FIG. 3) respectively corresponding to the signal lines 5A, 5B, 5C and 5D of the LAN cable 5 of the eight contacts are explained, similar to the output terminals for LAN cable 25a, 25b.

The output terminal for BNC cable 32 is comprised of five output terminals for outputting a RGB signal, similar to the input terminal for BNC cable 21 of the signal transmitter 2, and has a R output terminal 32R, a G output terminal 32G and a B output terminal 32B respectively corresponding to R, G, B signals, and a HD output terminal 32H and a VD output terminal 32V respectively corresponding to the horizontal synchronous signal HD and the vertical synchronous signal VD.

The sound signal output terminal 33 is a RCA pin jack for outputting analog sound signals $L_A$, $R_A$, similar to the sound signal input terminal 23 of the signal transmitter 2, and has a left sound signal output terminal 33L corresponding to the left analog sound signal $L_A$ and a right sound signal output terminal 33R corresponding to the right analog sound signal $R_A$.

Figure 3:
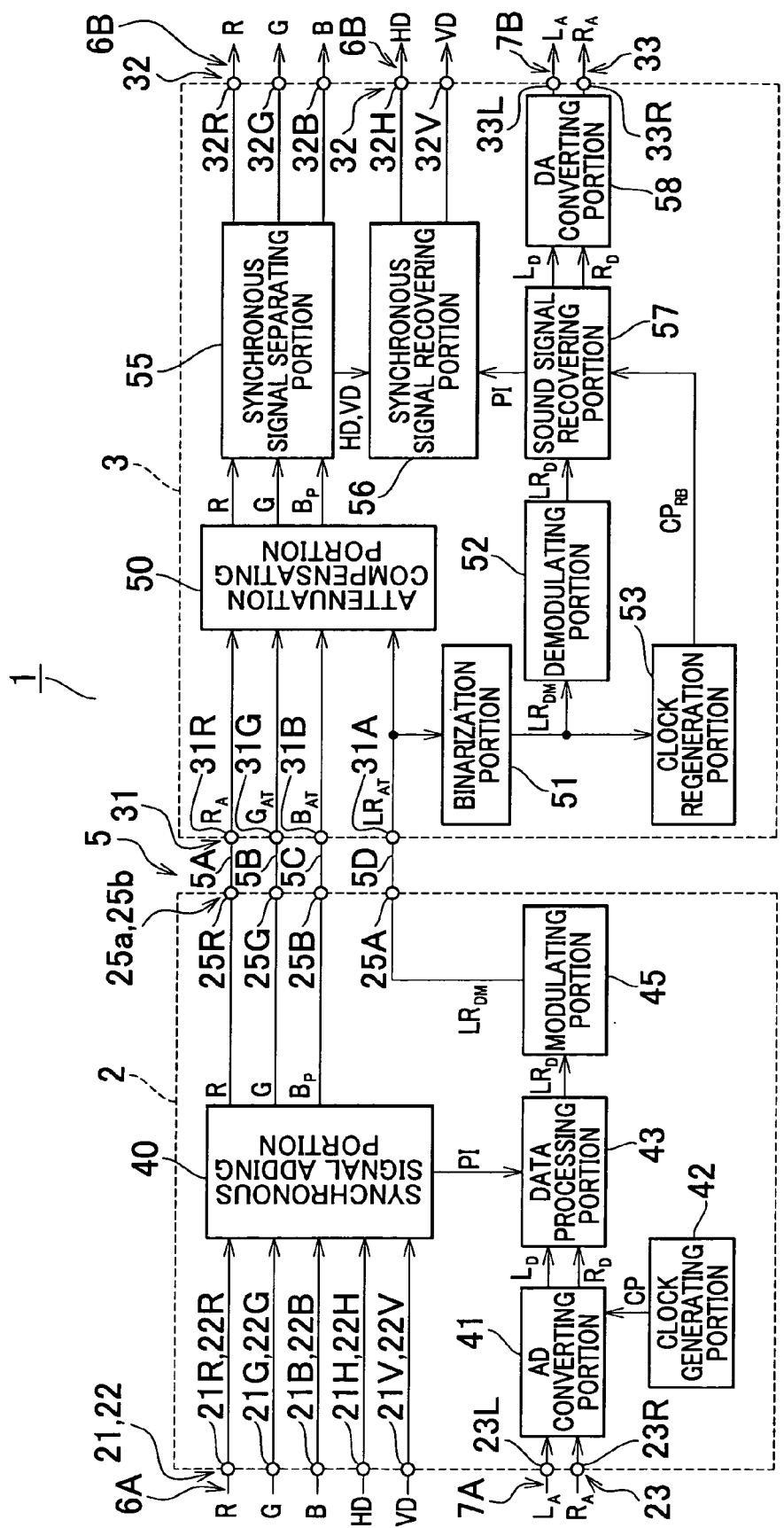
FIG. 3 is a block diagram showing structures of the signal transmitter and the signal receiver.

FIG. 3 is a block diagram showing structures of the signal transmitter 2 and the signal receiver 3. The signal transmitter 2 on the left side of the figure has a synchronous signal adding portion 40, an AD converting portion 41, a clock generating portion 42, a data processing portion 43, and a modulating portion 45.

The synchronous signal adding portion 40 is connected with the input terminal for BNC cable 21 or the input terminal for DSUB cable 22 through distributing means (not shown). Concretely speaking, the synchronous signal adding portion 40 is connected with the R input terminal 21R, the G input terminal 21G, the B input terminal 21B, the HD input terminal 21H and the VD input terminal 21V if the input terminal for BNC cable 21 is selected as the input channel through a selection switch (not shown), and is connected with the R input pin 22R, the G input pin 22G, the B input pin 22B, the HD input pin 22H and the VD input pin 22V if the input terminal for DSUB cable 22 is selected as the input channel through a selection switch.

The AD converting portion 41 is connected with the left sound signal input terminal 23L and the right sound signal input terminal 23R of the sound signal input terminal 23. The clock generating portion 42 is connected with the AD converting portion 41, and the AD converting portion 41 and the synchronous signal adding portion 40 are connected with the data processing portion 43. And, the data processing portion 43 is connected with the modulating portion The synchronous signal adding portion 40 is connected with the output contacts 25R, 25G an 25B of the output terminals for LAN cable 25a, 25b, and the modulating portion 45 is connected with the output contact 25A of the output terminals for LAN cable 25a, 25b.

And, the signal receiver 3 shown on the right hand of FIG. 3 (inside a frame with a broken line) has an attenuation compensating portion 50, a binarization portion 51, a demodulating portion 52, a clock regeneration portion 53, a synchronous signal separating portion 55, a synchronous signal recovering portion 56, a sound signal recovering portion 57, and the DA converting portion 58.

The attenuation compensating portion 50 is connected with the input contacts 31R, 31G, 31B and 31A of the input terminal for LAN cable 31, and the binarization portion 51 is connected with the input contact 31A of the input terminal for LAN cable 31.

The attenuation compensating portion 50 is connected with the synchronous signal separating portion 55, and the synchronous signal separating portion 55 is connected with the synchronous signal recovering portion 56. And, the binarization portion 51 is connected with the demodulating portion 52 and the clock regeneration portion 53. The demodulating portion 52 and the clock regeneration portion 53 are connected with the sound signal recovering portion 57, and the sound signal recovering portion 57 is connected with the synchronous signal recovering portion 56 and the DA converting portion 58.

The synchronous signal separating portion 55 is connected with the R output terminal 32R, the G output terminal 32G, and the B output terminal 32B of the output terminal for BNC cable 32, and the synchronous signal recovering portion 56 is connected with the HD output terminal 32H and the VD output terminal 32V of the output terminal for BNC cable 32. And, the DA converting portion 58 is connected with the left sound signal output terminal 33L and the right sound signal output terminal 33R of the sound signal output terminal 33.

Figure 4:
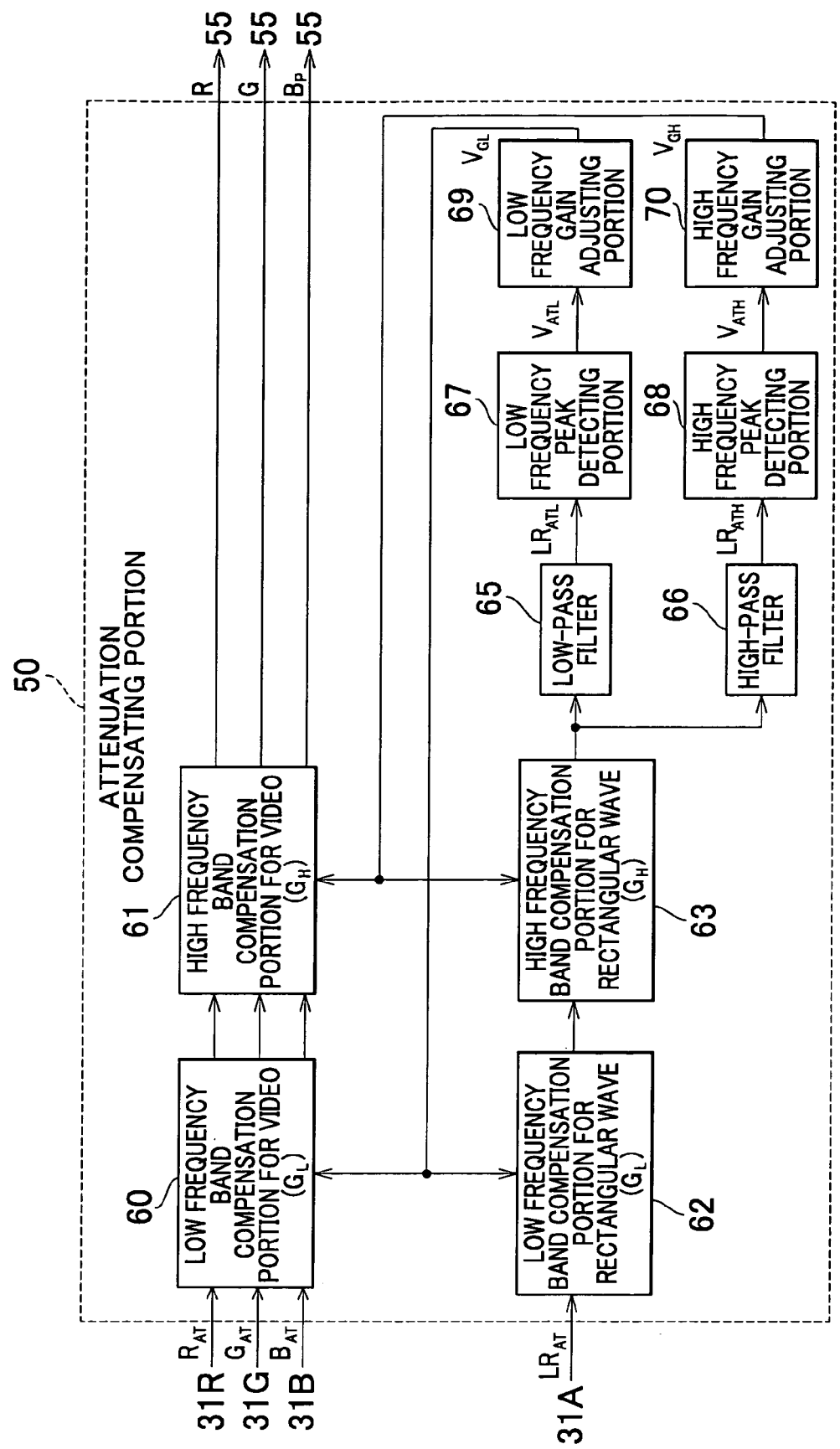
FIG. 4 is a block diagram showing a structure of an attenuation compensating portion.

FIG. 4 is a block diagram showing a structure of the attenuation compensating portion 50 as shown in FIG. 3. The attenuation compensating portion 50 (inside a frame with a broken line) has an AGC (automatic gain control) circuit, and in concrete, has a low frequency band compensation portion for video 60, a high frequency band compensation portion for video 61, a low frequency band compensation portion for rectangular wave 62, a high frequency band compensation portion for rectangular wave 63, and a low-pass filter 65, a high-pass filter 66, a low frequency peak detecting portion 67, a high frequency peak detecting portion 68, a low frequency gain adjusting portion 69 and a high frequency gain adjusting portion 70.

The low frequency band compensation portion for video 60 is connected with the input contacts 31R, 31G and 31B of the input terminal for LAN cable 31, and is connected with the synchronous signal separating portion 55 (see FIG. 3) through the high frequency band compensation portion for video 61. The low frequency band compensation portion for rectangular wave 62 is connected with the input terminal 31A of the input terminal for LAN cable 31.

The low frequency band compensation portion for rectangular wave 62 is connected with the low-pass filter 65 and the high-pass filter 66 through the high frequency band compensation portion for rectangular wave 63. The low-pass filter 65 is connected with the low frequency gain adjusting portion 69 through the low frequency peak detecting portion 67, and the high-pass filter 66 is connected with the high frequency gain adjusting portion 70 through the high frequency peak detecting portion 68. And, the low frequency gain adjusting portion 69 is connected with the low frequency band compensation portion for video 60 and the low frequency band compensation portion for rectangular wave 62, and the high frequency gain adjusting portion 70 is connected with the high frequency band compensation portion for video 61 and the high frequency band compensation portion for rectangular wave 63.

In order to output video signals and sound signals from the personal computer 9, for instance, to the plasma display 10, for instance, with the cable extension unit 1 having the above-mentioned structure, an operator connects the personal computer 9, the signal transmitter 2, the signal receiver 3, and the plasma display 10 therebetween through predetermined cables.

The video signals from the personal computer 9 are the RGB signals which are comprised of five signals, the color signals R, G, B and the synchronous signals HD, VD. And, the sound signals from the personal computer 9 are the analog stereo sound signals which are comprised of two signals, the left and right analog sound signals $L_A$, $R_A$. Then, the number of the signals to be inputted is seven in total.

The invention can be also applied in a case where the cable for connecting the signal transmitter 2 and the signal receiver 3 with each other can individually transmit the above-mentioned seven signals (that is, in a case where the number of the signal lines is seven or more). But, an embodiment with the cable which is comprised of the signal lines having the number smaller than one of the signals is proper when explaining characteristics of the invention. The embodiment of the invention refers to the case where the signal transmitter 2 and the signal receiver 3 are connected with each other through the LAN cable 5 which is comprised of four signal lines, as shown in FIG. 1. In this case, only output terminal for LAN cable 25a of the signal transmitter 2 is used.

Then, the output contact 25R of the output terminal for LAN cable 25a is connected with the input contact 31R of the input terminal for LAN cable 31 through the signal line 5A of the LAN cable 5, as shown in a center of FIG. 3. In similar ways, the output contact 25G is connected with the input contact 31G through the signal line 5B, and the output contact 25B is connected with the input contact 31B through the signal line 5C, and the output contact 25A is connected with the input contact 31A through the signal line 5D.

For easy explanation, in this embodiment, the video input source is only personal computer 9, as shown in FIG. 1, and the personal computer 9 is connected with the signal transmitter 2 through the BNC cable 6A and the RCA cable 7A, and the video input source is only plasma display 10, and the plasma display 10 is connected with the signal receiver 3 through the BNC cable 6B and the RCA cable 7B.

In this state, an operator respectively boots the personal computer 9, the signal transmitter 2, the signal receiver 3, and the plasma display 10, and selects the BNC cable input terminal 21 through a selection switch (not shown) of the signal transmitter 2 as an input channel, and inputs an instruction to output video signals and sound signals through an input means (not shown) of the personal computer 9.

Then, the color signals R, G, B and the synchronous signals HD, VD are outputted to the signal transmitter 2 from the main body 9A of the personal computer through the display 9B and the BNC cable 6A. And, the analog sound signals $L_A$, $R_A$ which are synchronous with the RGB signals are outputted from the main body 9A of the personal computer to the signal transmitter 2 through the RCA cable 7A.

The R signal R, the G signal G, and the B signal B, the horizontal synchronous signal HD and the vertical synchronous signal VD which were outputted are respectively inputted into the synchronous signal adding portion 40 through the R input terminal 21R, the G input terminal 21G, the B input terminal 21B, and the HD input terminal 21H and the VD input terminal 21V, as shown on the left hand of FIG. 3. And, the left analog sound signal $L_A$ and the right analog sound signal $R_A$ which were outputted are respectively inputted into the AD converting portion 41 through the left sound signal input terminal 23L and the right sound signal input terminal 23R.

In order to transmit the inputted color signals R, G, B and the synchronous signals HD, VD (that is, five signals) to the signal receiver 3 through the three signal lines 5A, 5B, 5C of the signal lines 5A, 5B, 5C, 5D of the LAN cable 5, the synchronous signal adding portion 40 gets the synchronous signals HD, VD to overlap with the B signal B. In the following descriptions, the B signal B overlapped with the synchronous signals HD, VD is referred to as "B signal $B_P$". The color signal overlapped with the synchronous signals HD, VD is not always the B signal B, but different color signals (such as, the R signal R, and the B signal B) may be respectively overlapped with the synchronous signals HD, VD.

When judging polarities of the inputted synchronous signals HD and VD and judging the polarities to be positive, the synchronous signal adding portion 40 inverts the polarities of the synchronous signals HD, VD and gets the B signal B to overlap with the synchronous signals HD, VD. When judging the polarities to be negative, on the contrary, the portion 40 gets the B signal B to overlap with the synchronous signals HD, VD without inverting their polarities.

The polarities of the synchronous signals HD, VD are different (positive or negative), depending on resolutions of images or kinds of displays. If the B signal B is always overlapped with the synchronous signals HD, VD having negative polarities, the signals can be prevented from being mixed, so that the signal receiver 3 can easily separate the synchronous signals HD, VD from the B signal $B_P$.

Subsequently, the synchronous signal adding portion 40 outputs polarity information PI, "1" if the polarity is positive, or "0" if the polarity is negative, which is based on the results which have been judged as to the polarities of the synchronous signals HD, VD to the data processing portion 43 in order to recover the synchronous signals HD, VD on the signal receiver 3 side.

After thus getting the B signal B to overlap with the synchronous signals HD, VD, the synchronous signal adding portion 40 respectively outputs the R signal R, the G signal G and the B signal $B_P$ to the output contacts 25R, 25G and 25B of the output terminal for LAN cable 25a.

As mentioned above, the analog sound signals $L_A$, $R_A$ outputted from the main body 9A of the personal computer have been inputted into the AD converting portion 41 through the sound signal input terminals 23L, 23R. As described hereinafter, the data processing portion 43 executes parallel/serial conversion in order to transmit the inputted analog sound signals $L_A$, $R_A$ (that is, two signals) to the signal receiver 3 through one signal line 5D of the signal lines 5A, 5B, 5C and 5D of the LAN cable 5. Then, the AD converting portion 41 converts the inputted analog sound signals $L_A$, $R_A$ into the digital signals (AD conversion).

In concrete, the clock generating portion 42 is provided with an OSC (quartz oscillator), and always outputs predetermined frequency (e.g. 11.3 MHz) of clock pulses CP to the AD converting portion 41 after booting the signal transmitter 2. The AD converting portion 41 divides the frequency of the inputted clock pulse CP (into 1/256, for instance), and the inputted analog sound signals $L_A$, $R_A$ are respectively sampled with the divided frequency of the clock pulse CP as sampling frequency (e.g. 44.1 kHz).

In this case, eight bits is set as bit length (quantized bit number) per sampling. When sampling the analog sound signals $L_A$, $R_A$, the AD converting portion 41 successively generates pulses PL having 8 bits of digital data DD (1 or 0) every sampling. In the later explanation, 8 bits of digital data DD is referred to as sound data SD.

The pulse PL of the digital data DD means change of voltage V which corresponds to change of the digital data DD (from 0 to 1 or from 1 to 0), and this change of the voltage V is expressed by an edge portion PE (will be described later) which shows rising or falling of the voltage V. The change of the voltage V may be positive or negative, but in this case, an amplitude of the pulse PL is set on positive voltage "$V_0$".

If the sound data SD of the sampled analog sound signals $L_A$, $R_A$ is "00101100" for instance as shown in FIG. 5(a), the AD converting portion 41 changes the voltage V from 0 into $V_0$ according to the change of the digital data DD from 0 into 1 at a point of time t3, and changes the voltage V into 0 according to the change of the digital data DD from 1 to 0 at a point of time t4. Then, the pulse PL where the voltage changes at the edge portion PE generates at the points of time t3, t4 when the digital data DD being changed.

When changing digital data DD from 0 into 1 again at a point of time t5, the AD converting portion 41 changes the voltage V from 0 into $V_0$ again, and when changing the digital data DD from 1 into 0 at a point of time t7, the AD converting portion 41 changes the voltage V into 0, in a similar way. Then, the pulses PL having amplitude $V_0$ are arranged between the points of time t3 and t4 and between the points of time t5 and t7, corresponding to the sound data SD "00101100".

The AD converting portion 41 converts the right and left sampled analog sound signals $L_A$, $R_A$ into digital signals, and outputs the sound signals which were converted into digital signals ("the digital sound signals $L_D$, $R_D$" hereinafter) to the data processing portion 43. In the following explanation, the sound data SD as shown by the left digital sound signal $L_D$ is referred to as left sound data $SD_L$, and the sound data SD as shown by the right digital sound signal $R_D$ is referred to as right sound data $SD_R$.

The data processing portion 43 executes parallel/serial conversion on the digital sound signals $L_D$, $R_D$ when the digital sound signals $L_D$, $R_D$ being inputted.

Concretely speaking, the data processing portion 43 arranges the left and right sound data $SD_L$, $SD_R$ in predetermined orders. The arrangement in any order is available as long as the digital sound signals $L_D$, $R_D$ can be serialized. In this setting, the right and left sound data $SD_L$, $SD_R$ are arranged in left, right order every sampling. A predetermined data length is provided in each of areas between the right and left sound data $SD_L$ and $SD_R$, and between an arrangement of the right and left sound data $SD_L$ and $SD_R$ and the subsequent arrangement thereof. In the following explanation, such areas are referred to as non-sound data areas NDA.

Then, the data processing portion 43 successively arranges the right and left sound data $SD_L$, $SD_R$ in left right order every sampling, and converts the inputted digital sound signal $L_D$, $R_D$ into serialized sound signals ("the serial sound signal $LR_D$ hereinafter).

The sound signal to be inputted into the signal transmitter 2 is not always an analog signal. In case of the digital signal which is used for a CD (compact disc) or a DVD (digital versatile disc), AD conversion by the AD converting portion 41 is not necessary. In case where the sound signal to be inputted is a serial signal, parallel/serial conversion by the data processing portion 43 is not necessary.

After parallel/serial conversion of the digital sound signals $L_D$, $R_D$, the data processing portion 43 adds a specific pattern which shows an end between samplings and the polarity information PI which has been inputted from the synchronous signal adding portion 40 to a predetermined position of the non sound data area NDA, and outputs the serial sound signal $LR_D$ to which the specific pattern and the polarity information PI has been added to the modulating portion 45.

After parallel/serial conversion of the digital sound signals $L_D$, $R_D$, the modulating portion 45 modulates the inputted serial sound signal $LR_D$ into a serial modulation signal $LR_{DM}$. Concrete procedures for modulating the serial sound signal $LR_D$ as shown in FIG. 5(a) if inputted into the modulating portion 45 will now be explained.

Figure 5:
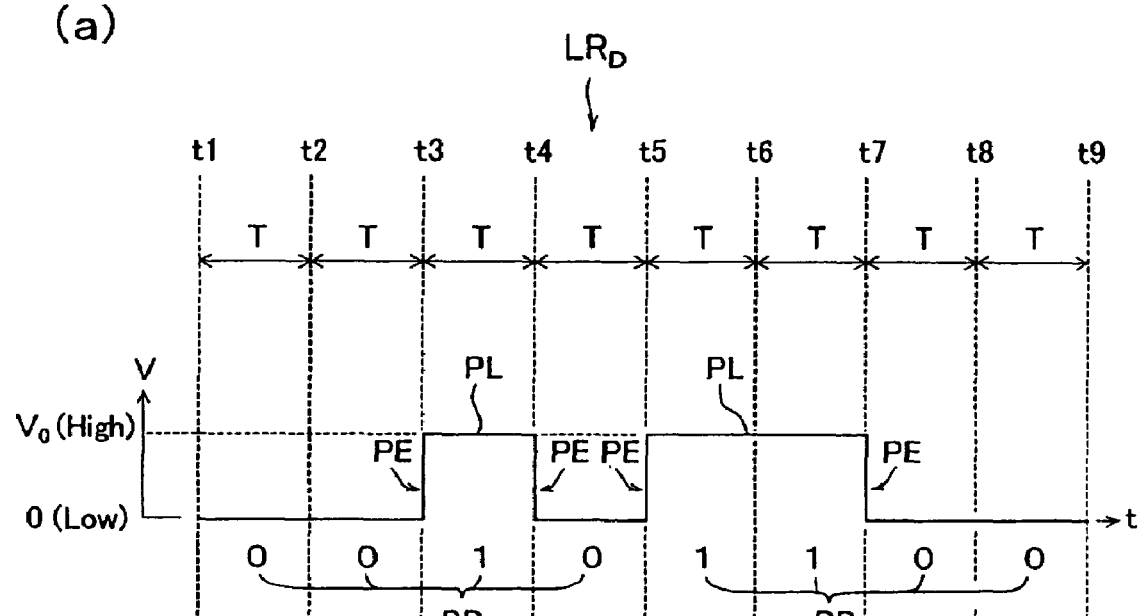
FIG. 5 is a view for explaining modulation processing, wherein (a) is a time chart showing a serial sound signal, (b) is a time chart showing a serial modulation signal obtained by modulating the serial sound signal of (a)
Figure 5:
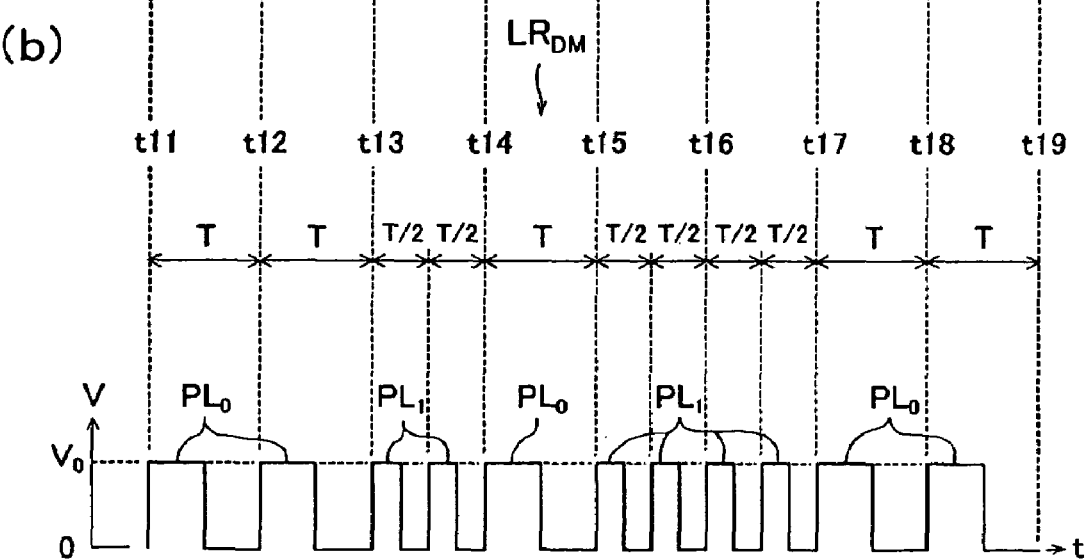

The modulating portion 45 detects the voltage V of the serial sound signal $LR_D$ to be inputted every bit time T (time width per bit) as shown in FIG. 5 after booting the signal transmitter 2, and judges as to whether or not the detected voltage V exceeds a predetermined threshold voltage (e.g. $V_0/2$). If the detected voltage V is judged to not exceed the predetermined threshold voltage (e.g. $V_0/2$) (that is, if Low is inputted), the modulating portion 45 outputs a rectangular wave of period T. If exceeding the predetermined threshold voltage (e.g. $V_0/2$) (that is, if High is inputted), the modulating portion 45 outputs a rectangular wave of period T/2

If the serial sound signal $LR_D$ as shown in FIG. 5(*a*) is inputted into the modulating portion 45 from the left side of the figure (from the point of time t1), the modulating portion 45 judges that the voltage V does not exceed the predetermined threshold voltage at a point of time t11 since the voltage V of the inputted serial sound signal $LR_D$ is "0" at the point of time t1 corresponding to t11, and generates the pulse $PL_0$ as shown in FIG. 5(*b*). Since the voltage V of the serial sound signal $LR_D$ is also "0" at the point of time t2, the modulating portion 45 judges in a similar way at the corresponding point of time t12 and generates the pulse $PL_0$.

When the voltage V of the serial sound signal $LR_D$ becomes "$V_0$" at the point of time t3, the modulating portion 45 judges that the voltage V exceeds the predetermined threshold voltage at a point of time t13 corresponding thereto, and generates the pulse $PL_1$, as shown in FIG. 5(*b*)

When the voltage V of the serial sound signal $LR_D$ becomes "0" again at the point of time t4, the modulating portion 45 judges that the voltage V does not exceed the predetermined threshold voltage at a point of time t14 corresponding thereto, and generates the pulse $PL_0$ again. In similar ways, the modulating portion 45 generates the pulses $PL_1$ between points of time t15 and t17 and the pulses $PL_0$ between points of times t17 and t19.

As shown in FIG. 5, the modulating portion 45 outputs the rectangular waves having a changed period, depending on High/Low of the voltage V of the serial sound signal $LR_D$ to be inputted, that is, corresponding to the digital data DD of the serial sound signal $LR_D$ so as to thus modulate the serial sound signal $LR_D$. After modulating the serial sound signal $LR_D$, the modulating portion 45 outputs the modulated serial sound signal $LR_D$ to the output contact 25A of the output terminal for LAN cable 25*a* as the serial modulation signal $LR_{DM}$.

As shown in a center of FIG. 3, the R signal R, the G signal G and the B signal $B_P$ which have been outputted from the synchronous signal adding portion 40 are thus outputted from the signal transmitter 2 through the output contacts 25R, 25G and 25B of the output terminal for LAN cable 25*a*. The serial modulation signal $LR_{DM}$ which has been outputted from the modulating portion 45 is also outputted from the signal transmitter 2 through the output contact 25A of the output terminal for LAN cable 25*a*.

After outputting the R signal R, the G signal G, the B signal $B_P$, and the serial modulation signal $LR_{DM}$ from the signal transmitter 2, these signals are transmitted for the signal receiver 3 through the signal lines 5A, 5B, 5C, 5D of the LAN cable 5. In other words, the seven signals (the color signals R, G, B, the synchronous signals HD, VD, and the right and left analog sound signals $L_A$, $R_A$) are transmitted to the signal receiver 3 through the four signal lines 5A, 5B, 5C and 5D comprising the LAN cable 5.

When transmitting electric signals, such as video signals and sound signals, through cables, these signals attenuate, depending on materials or dimensions (line diameter or length) of the signal lines comprising the cable or frequencies of the signals. The quantity of the attenuation is expressed by an attenuation factor AQ (unit "dB"). The higher resistivity of a material is, or the shorter the line diameter is, or the longer the signal line is, or the higher the frequency of the signal is, the higher the attenuation factor AQ is.

In this embodiment, the signal lines 5A, 5B, 5C and 5D comprising the LAN cable 5 are all the same in the material, the line diameter, the cable length for easy explanation. Therefore, each attenuation factor AQ of the signal lines 5A, 5B, 5C and 5D changes, depending on the frequency of the signal to be transmitted only.

All signals can be expressed by sine waves of various frequencies (frequency components) according to Fourier Expansion, so that the amplitudes of respective frequency components which are included in a signal attenuate on the basis of the attenuation factor AQ which depends on each frequency, irrespective of waveforms of the signals.

The color signals R, G, $B_P$ and the serial modulation signal $LR_{DM}$ are completely different from each other in their waveforms since the color signals R, G, BP have waveforms corresponding to videos which momentarily change and the serial modulation signal $LR_{DM}$ has a rectangular wave as shown in FIG. 5(*b*). But, the same frequency components which are included in both types of signals are the same in their attenuation factors AQ.

When transferring the color signals R, G, $B_P$ and the serial modulation signal $LR_{DM}$ through the signal lines 5A, 5B, 5C, 5D, the same frequency components which are included in both types of signals attenuate at the same rate, and these signals are inputted into the input contacts 31R, 31G, 31B and 31A of the input terminal for LAN cable 31.

In the following explanation, the color signals R, G, $B_P$ and the serial modulation signal $LR_{DM}$ which have been attenuated are respectively referred to as an attenuation R signal $R_{AT}$, an attenuation G signal $G_{AT}$, an attenuation B signal $B_{AT}$, and an attenuation serial signal $LR_{AT}$, as shown in a center of FIG. 3. The attenuation R signal $R_{AT}$, the attenuation G signal $G_{AT}$, the attenuation B signal $B_{AT}$ are referred to as attenuation color signals $R_{AT}$, $G_{AT}$, and $B_{AT}$ if no distinction is necessary.

Figure 6:
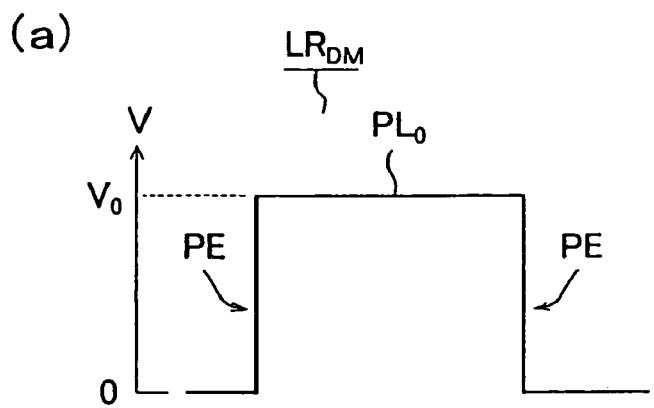
FIG. 6 is a view showing waveforms of an attenuation serial signal, wherein (a) shows a pulse before attenuation, (b) shows an attenuation pulse of the pulse as shown in (a), (c) shows a low frequency waveform of the attenuation pulse as shown in (b) and (d) shows a high frequency waveform of the attenuation pulse as shown in (b)
Figure 6:
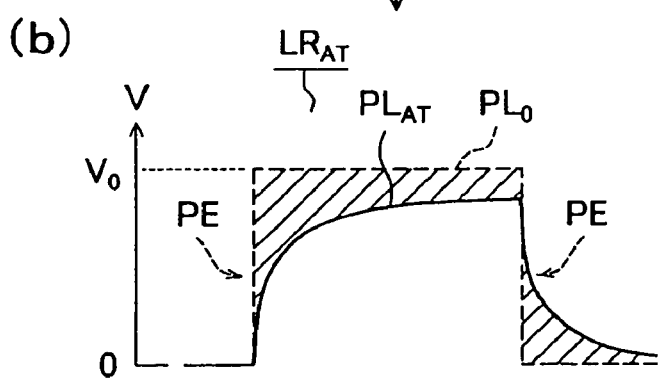
Figure 6:
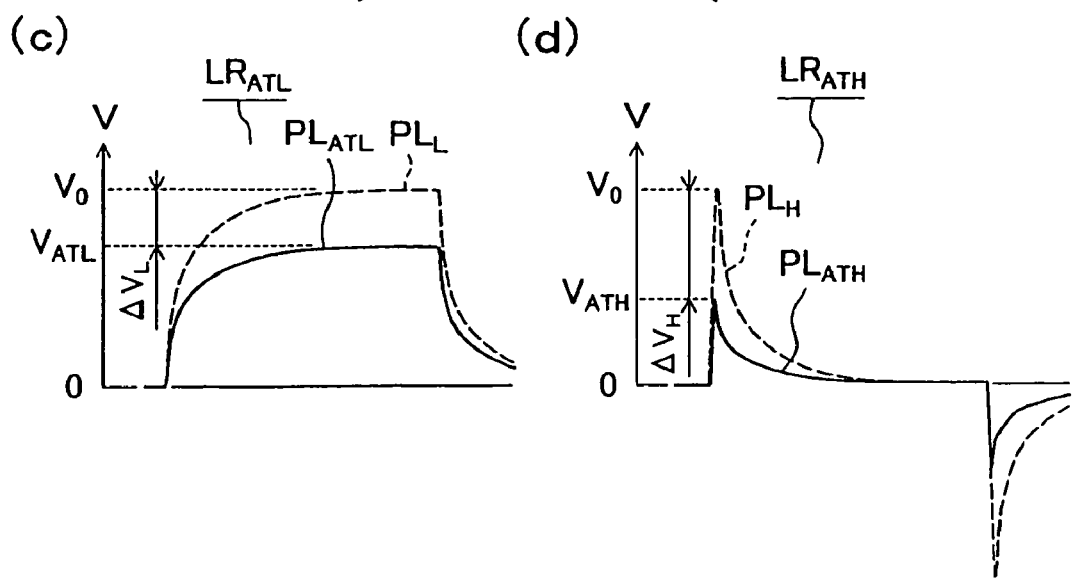

The pulse $PL_0$ of the attenuation serial signal $LR_{AT}$ ("the attenuation pulse $PL_{AT}$" hereinafter) will now be explained, referring to FIG. 6. FIG. 6 are views showing waveforms of the attenuation serial signal $LR_{AT}$, wherein (a) shows a pulse $PL_0$ before attenuation, (b) shows an attenuation pulse $PL_{AT}$, (c) shows a low frequency waveform of the attenuation pulse $PL_{AT}$, and (d) shows a high frequency waveform of the attenuation pulse PLAT. The waveforms after attenuation of FIGS. 6(*b*) through (*d*) are simply shown in order to easily understand the invention As shown in FIG. 6(*a*), the pulse $PL_0$ of the serial modulation signal $LR_{DM}$ is a rectangular wave before attenuation. The rectangular wave includes wide bounds of frequency components from low frequency till high frequency (infinite frequencies in theory) and the edge portions PE which show rising and falling of the voltage V are formed by the frequency components in a high frequency band.

As mentioned before, the attenuation factor AQ becomes bigger as the frequency becomes higher. When transferring the serial modulation signal $LR_{DM}$ through the LAN cable 5, the nearer to the high frequency band the frequency component is, the more the amplitude attenuates. As shown in FIG. 6(*b*), the amplitude of the pulse $PL_0$ in a periphery of the edge portion PE especially attenuates without equally attenuating the amplitude thereof, and the attenuation pulse $PL_{AT}$ (full line) has the waveform wherein hatched portions to the pulse $PL_0$ (broken line) attenuate.

The pulse $PL_1$ of the serial modulation signal $LR_{DM}$ is also a rectangular wave, as shown in FIG. 5(*b*). When transferring the signal through the LAN cable 5, the amplitude attenuates in the periphery of the edge portion PE (not shown), especially, similar to the attenuation pulse $PL_{AT}$ of FIG. 6(*b*).

Although the serial modulation signal $LR_{DM}$ which is comprised of the pulses $PL_0$, $PL_1$ changes in the number of the pulses $PL_0$, $PL_1$ owing to change of the analog sound signals $L_A$, $R_A$, the signal $LR_{DM}$ has generally has a determined distribution of frequencies (spectrum), being different from the color signals R, G, B since it is comprised of rectangular waves (amplitude is $V_0$, and period is T or T/2) the waveforms of which are already determined.

Therefore, the attenuation factor AQ corresponding to the frequency can be predicted from a distribution of frequencies of the serial modulation signal $LR_{DM}$ on the basis of the attenuation of the pulses $PL_0$, $PL_1$. Since the attenuation factor AQ changes irrespective of waveforms, depending on frequencies only as already mentioned, the attenuation of the color signals R, G, $B_P$ can be compensated with the attenuation factor AQ which is predicted from the distribution of frequencies of the serial modulation signal $LR_{DM}$.

In other words, in the invention, the attenuation of the color signals R, G, B are compensated in such a manner that displacement volume of the amplitude of the attenuated frequency component is computed from the distribution of the frequencies of the serial modulation signal $LR_{DM}$, and the attenuation of the frequency component which is included in each of the R signal R, the G signal G and the B signal B, the frequency component being also included in the serial modulation signal $LR_{DM}$, is compensated according to the computed displacement volume.

In this embodiment of the invention, the attenuation serial signal $LR_{AT}$ is divided into two frequency bands, low frequency band and high frequency band, and attenuation color signals $R_{AT}$, $G_{AT}$, $B_{AT}$ are compensated. But, it is not necessary to always divide into two frequency bands. For instance, rough compensation of attenuation may be possible by compensating the high frequency band only, or fully compensation of attenuation may be possible by dividing into three or more frequency bands.

The attenuation R signal $R_{AT}$, the attenuation G signal $G_{AT}$, the attenuation B signal $B_{AT}$ which were thus inputted into the signal receiver 3 are respectively inputted into the attenuation compensating portion 50 through the input contacts 31R, 31G, 31B of the input terminal for LAN cable 31. And, the attenuation serial signal $LR_{AT}$ which was inputted into the signal receiver 3 is inputted into the attenuation compensating portion 50 and the binarization portion 51 through the input contact 31A of the input terminal for LAN cable 31.

The attenuation color signals $R_{AT}$, $G_{AT}$, $B_{AT}$ which were inputted into the attenuation compensating portion 50 are inputted into the low frequency band compensation portion for video 60 inside the attenuation compensating portion 50 (inside a broken line), and the attenuation serial signal $LR_{AT}$ which was inputted into the attenuation compensating portion 50 is inputted into the low frequency band compensation portion for rectangular wave 62 inside the attenuation compensating portion 50, as shown on the left hand in FIG. 4.

At this moment, gain adjustment voltages $V_{GH}$, $V_{GL}$ (will be described later) have not yet been outputted to the low frequency band compensation portion for video 60, the high frequency band compensation portion for video 61, the low frequency band compensation portion for rectangular wave 62 and the high frequency band compensation portion for rectangular wave 63 from the low frequency gain adjusting portion 69 and the high frequency gain adjusting portion 70 inside the attenuation compensating portion 50 as shown in FIG. 4. Therefore, the attenuation serial signal $LR_{AT}$ is outputted from the high frequency band compensation portion for rectangular wave 63 through the low frequency band compensation portion for rectangular wave 62 as it is. The outputted attenuation serial signal $LR_{AT}$ is branched and inputted into the low-pass filter 65 and the high-pass filter 66.

The low-pass filter 65 cuts the frequency component in a predetermined high frequency band which is included in the inputted attenuation serial signal $LR_{AT}$ and passes the attenuation serial signal $LR_{AT}$ which is comprised of the frequency components ("low frequency component LF" hereinafter) in a predetermined low frequency band ("low frequency attenuation signal $LR_{ATL}$" hereinafter), as shown in FIG. 6(c).

Contrary to the low-pass filter 65, the high-pass filter 66 cuts the frequency component in a predetermined low frequency band which is included in the inputted attenuation serial signal $LR_{AT}$ and passes the attenuation serial signal $LR_{AT}$ which is comprised of the frequency components ("high frequency component HF" hereinafter) in a predetermined high frequency band ("high frequency attenuation signal $LR_{ATH}$" hereinafter), as shown in FIG. 6(d).

The low frequency attenuation signal $LR_{ATL}$ and the high frequency attenuation signal $LR_{ATH}$ as shown in FIG. 6(c), (d) respectively show the pulse after passing the attenuation pulse $PL_{AT}$ in FIG. 6(b) through the low-pass filter 65 ("low frequency attenuation pulse $PL_{ATL}$" hereinafter) and the pulse after passing the attenuation pulse $PL_{AT}$ through the high-pass filter 66 ("high frequency attenuation pulse $PL_{ATH}$" hereinafter) with full lines. In FIG. 6 (c) and (d), a pulse after passing the serial modulation signal $LR_{DM}$ which is not attenuated through the low-pass filter 65 ("low frequency pulse $PL_L$" hereinafter) and a pulse after passing the serial modulation signal $LR_{DM}$ which is not attenuated through the high-pass filter 66 ("high frequency pulse $PL_H$ hereinafter) are shown with broken lines for comparison.

Then, the low-pass filter 65 outputs the low frequency attenuation pulse $PL_{ATL}$ having the peak voltage $V_{ATL}$ (full line) where the peak voltage is attenuated by difference voltage $\Delta V_L$ with respect to the low frequency pulse $PL_L$ (broken line) to the low frequency peak detecting portion 67, as shown in FIG. 6(c).

And, the high-pass filter 66 outputs the high frequency attenuation pulse $PL_{ATH}$ having the peak voltage $V_{ATH}$ (full line) where the peak voltage is attenuated by difference voltage $\Delta V_H$ with respect to the high frequency pulse $PL_H$ (broken line) to the high frequency peak detecting portion 68, as shown in FIG. 6(d). As mentioned before, the higher a frequency is, the bigger the attenuation factor AQ is. Therefore, the peak voltage $V_0$ is widely attenuated in comparison with a case of FIG. 6(c), and the difference voltage $\Delta V_H$ is bigger than the difference voltage $\Delta V_L$ of FIG. 6(c).

After thus outputting the low frequency attenuation pulse $PL_{ATL}$ of the low frequency attenuation signal $LR_{ATL}$ (see FIG. 6(c)) from the low-pass filter 65, the low frequency peak detecting portion 67 detects the peak voltage $V_{ATL}$ of the inputted low frequency attenuation pulse $PL_{ATL}$ and outputs it to the low frequency gain adjusting portion 69.

After thus outputting the high frequency attenuation pulse $PL_{ATH}$ of the high frequency attenuation signal $LR_{ATH}$ (see FIG. 6(d)) from the high-pass filter 66, the high frequency peak detecting portion 68 also detects the peak voltage $V_{ATH}$ of the inputted high frequency attenuation pulse $PL_{ATH}$ and outputs it to the high frequency gain adjusting portion 70, similar to the low frequency peak detecting portion 67.

Each of the low frequency gain adjusting portion 69 and the high frequency gain adjusting portion 70 is provided with a comparator (not shown). The voltage $V_0$ which is the same as the peak voltages of the low frequency pulse PLL and the high frequency pulse $PL_H$ which are shown in FIG. 6(c) and (d) is always inputted in each comparator as a standard voltage.

when the voltage $V_{ATL}$ being inputted, the low frequency gain adjusting portion 69 computes the difference voltage $\Delta V_L$ between the inputted voltage $V_0$ and the voltage $V_{ATL}$, and outputs a low frequency gain adjustment voltage $V_{GL}$ which corresponds to the computed difference voltage $\Delta V_L$ to the low frequency band compensation portion for video 60, and feeds it back to the low frequency band compensation portion for rectangular wave 62.

When the voltage $V_{ATH}$ being inputted, the high frequency gain adjusting portion 70 also computes the difference voltage $\Delta V_H$ between the inputted voltage $V_0$ and the voltage $V_{ATH}$, and outputs a high frequency gain adjustment voltage $V_{GH}$ which corresponds to the computed difference voltage $\Delta V_H$ to the high frequency band compensation portion for video 61, and feeds it back to the high frequency band compensation portion for rectangular wave 63, in a similar way to the low frequency gain adjusting portion 69.

Each of the low frequency band compensation portion for video 60, the low frequency band compensation portion for rectangular wave 62, the high frequency band compensation portion for video 61, the high frequency band compensation portion for rectangular wave 63 is provided with a variable gain amplifier (not shown). The variable gain amplitudes which are provided at the low frequency band compensation portion for video 60 and the low frequency band compensation portion for rectangular wave 62 freely adjust the low frequency gain GL (inside 60 and 62 of FIG. 4) on the basis of the voltage adding the low frequency gain adjustment voltage $V_{GL}$ to be successively inputted thereto. Similarly, the variable gain amplitudes which are provided at the high frequency band compensation portion for video 61 and the high frequency band compensation portion for rectangular wave 63 also freely adjust the high frequency gain $G_H$ (inside 60 and 62 of FIG. 4) on the basis of the voltage adding the high frequency gain adjustment voltage $V_{GH}$ to be successively inputted thereto.

When inputting the low frequency gain adjustment voltage $V_{GL}$ into the low frequency band compensation portion for video 60, the low frequency gain $G_L$ is adjusted into a proper value on the basis of the inputted low frequency gain adjustment voltage $V_{GL}$. When inputting the attenuation color signals $R_{AT}$, $G_{AT}$, $B_{AT}$ in the afore-mentioned state, the low frequency band compensation portion for video 60 amplifies a low frequency component LF which is included in each of the inputted attenuation color signals $R_{AT}$, $G_{AT}$, $B_{AT}$ predetermined times according to the adjusted low frequency gain $G_L$. And, the low frequency band compensation portion for video 60 outputs the attenuation color signals $R_{AT}$, $G_{AT}$, $B_{AT}$ wherein the low frequency component LF was predetermined times amplified to the high frequency band compensation portion for video 61.

When inputting the high frequency gain adjustment voltage $V_{GH}$ into the high frequency band compensation portion for video 61, the high frequency gain $G_H$ is adjusted into a proper value on the basis of the inputted high frequency gain adjustment voltage $V_{GH}$. When inputting the attenuation color signals $R_{AT}$, $G_{AT}$, $B_{AT}$ which were outputted by the low frequency band compensation portion for video 60 in the afore-mentioned state, the high frequency band compensation portion for video 61 amplifies a high frequency component HF which is included in each of the inputted attenuation color signals $R_{AT}$, $G_{AT}$, $B_{AT}$ predetermined times according to the adjusted high frequency gain $G_H$. Then, both high and low frequency bands are predetermined times amplified since the attenuation color signals $R_{AT}$, $G_{AT}$, $B_{AT}$ have already been amplified predetermined times in the low frequency components LF by the low frequency band compensation portion for video 60.

When feeding back the low frequency gain adjustment voltage $V_{GL}$ to the low frequency band compensation portion for rectangular wave 62, the low frequency gain $G_L$ is adjusted into a proper value on the basis of the inputted low frequency gain adjustment voltage $V_{GL}$. When inputting the attenuation serial signal $LR_{AT}$ in the afore-mentioned state, the low frequency band compensation portion for rectangular wave 62 amplifies the low frequency component LF which is included in the inputted attenuation serial signal $LR_{AT}$ predetermined times according to the adjusted low frequency gain $G_L$, similar to the low frequency band compensation portion for video 60. And, the low frequency band compensation portion for rectangular wave 62 outputs the attenuation serial signal $LR_{AT}$ wherein the low frequency component LF was amplified predetermined times to the high frequency band compensation portion for rectangular wave 63.

When feeding back the high gain adjustment voltage $V_{GH}$ to the high frequency band compensation portion for rectangular wave 63, the high frequency gain $G_H$ is adjusted into a proper value on the basis of the inputted high frequency gain adjustment voltage $V_{GH}$. When inputting the attenuation serial signal $LR_{AT}$ which was outputted by the low frequency band compensation portion for rectangular wave 62 in the afore-mentioned state, the high frequency band compensation portion for rectangular wave 63 amplifies the high frequency component HF which is included in the inputted attenuation serial signal $LR_{AT}$ predetermined times according to the adjusted high frequency gain $G_H$, similar to the high frequency band compensation portion for video 61. Then, both high and low frequency bands are predetermined times amplified, similar to the above-mentioned attenuation color signals $R_{AT}$, $G_{AT}$, $B_{AT}$ since the attenuation serial signal $LR_{AT}$ has already been amplified in the high frequency components HF predetermined times by the low frequency band compensation portion for rectangular wave 62.

When the attenuation serial signal $LR_{AT}$ being amplified predetermined times, the peak voltages $V_{ATL}$, $V_{ATH}$ of the low frequency attenuation pulse $PL_{ATL}$ and the high frequency attenuation pulse $PL_{ATH}$ (see FIG. 6(c), (d)) respectively approach the original peak voltage $V_0$, so that the difference voltages $\Delta V_L$, $\Delta V_H$ become smaller.

When inputting the attenuation serial signal $LR_{AT}$ which was amplified predetermined times from the high frequency band compensation portion for rectangular wave 63 into the low-pass filter 65 and the high-pass filter 66 again, the low frequency gain adjustment voltage $V_{GL}$ and the high frequency gain adjustment voltage $V_{GH}$ become smaller by decreased volume of the different voltages $\Delta V_L$, $\Delta V_H$, so that the increments of the low frequency gain $G_L$ and the high frequency gain $G_H$ are made smaller.

When thus repeating the above-mentioned feedback, the attenuation color signals $R_{AT}$, $G_{AT}$, $B_{AT}$ and the attenuation serial signal $LR_{AT}$ which are successively inputted into the attenuation compensating portion 50 are amplified according to the low frequency gain $G_L$ and the high frequency gain $G_H$ while gradually decreasing the increments of the low frequency gain $G_L$ and the high frequency gain $G_H$. When the peak voltages of the low frequency attenuation pulse $PL_{ATL}$ and the high frequency attenuation pulse $PL_{ATH}$ of FIG. 6(c), (d) reach the original peak voltage $V_0$ so that the difference voltages $\Delta V_L$, $\Delta V_H$ become zero, the low frequency gain $G_L$ and the high frequency gain $G_H$ reach predetermined values.

Since the difference voltages $\Delta V_L$, $\Delta V_H$ are zero, the waveform of the attenuation pulse $PL_{AT}$ as shown in FIG. 6(b) recovers into the original one of the pulse $PL_0$ (the rectangular wave as shown in FIG. 6(a)) by compensating the hatched portion in the periphery of the edge portion PE. As shown in FIG. 5(b), the pulse $PL_1$ which was attenuated similarly to the pulse $PL_0$ has the waveform which relatively resembles one of the pulse $PL_0$ although it is different from the pulse $PL_0$ in each period (twice), so that the distribution of frequencies thereof overlaps one of the pulse $PL_0$ in wide bounds. When the attenuation pulse $PL_{AT}$ recovers into the waveform of the pulse $PL_0$, therefore, the waveform of the pulse $PL_1$ also almost recovers.

At the same time, the waveforms of the attenuation color signals $R_{AT}$, $G_{AT}$, $B_{AT}$ similarly recover in the original states by compensating the attenuations of the low frequency component LF and the high frequency component HF included therein owing to the low frequency gain GL and the high frequency gain $G_H$ which reached predetermined values.

Since the waveforms of the color signals R, G, B changes according to videos which momentarily change, the respective distributions of the frequencies also change. But, the attenuation of the respective frequency components of the color signals R, G, B is compensated irrespective of the changes of the distributions of frequencies, and the attenuations of the attenuation color signals $R_{AT}$, $G_{AT}$, $B_{AT}$ to be successively inputted into the attenuation compensating portion 50 are compensated without problems since the same frequency components in the respective distributions of frequencies which are also included in the attenuation serial signal $LR_{AT}$ have the same attenuation factor AQ.

In the above-mentioned embodiment, the attenuation serial signal $LR_{AT}$ (that is, sound signal) is used only as a signal for compensation of the attenuation of the attenuation color signals $R_{AT}$, $G_{AT}$, $B_{AT}$ But, while using the attenuation serial signal $LR_{AT}$ as the signal for compensation, the signal which is obtained by compensating the attenuation of the attenuation serial signal $LR_{AT}$ may be outputted from the high frequency band compensation portion for rectangular wave 63 so as to use as a sound signal.

FIG. 4 shows the AGC circuit. But, the AGC circuit is not always such a structure in FIG. 4. Any circuit is available as long as the circuit can compensate the attenuated signal on the basis of the displacement of the amplitude (different voltage) which is accompanied by the attenuation of a pulse. For instance, the circuit may have such a structure that the waveform is divided into some number of frequency bands, and the divided are amplified by predetermined gains, and all waveforms divided are added.

The analog sound signals $L_A$, $R_A$ are thus converted into the digital signals wherein the pulses the waveforms are already determined are arranged, so that the attenuation factor AQ can be predicted on the basis of the attenuation of these pulses, and the attenuations of the attenuation color signals $R_{AT}$, $G_{AT}$, $B_{AT}$ can be compensated according to the predicted attenuation factors AQ.

The above-mentioned AD conversion by the AD converting portion 41 refers to PCM (pulse code modulation) for converting an analog signal into a quantized digital signal. For instance, PPM (pulse phase modulation) or PFM (pulse frequency modulation) are also available as well as PCM as long as pulses show digital data DD (in other words, pulses are not analog pulses the amplitudes or pulse widths of which change). Besides, the waveform of the pulse may be a trapezoidal wave, a triangle wave, a halfsine wave, as well as a rectangular wave. But, the rectangular wave is preferable in view of accurate compensation of attenuation since the rectangular wave includes wide bounds of frequencies.

The serial sound signal $LR_D$ is modulated into the serial modulation signal $LR_{DM}$ which is comprised of the pulses $PL_0$, $PL_1$ the periods of which change, corresponding to the digital data DD (according to High/Low), thereby transmitting periodic pulses to the signal receiver 3, irrespective of the presence of the pulse PL of the digital sound signal $LR_D$. Even if there is no pulse PL (even if Low state continues), therefore, the attenuation of the attenuation color signals $R_{AT}$, $G_{AT}$, $B_{AT}$ can be stably compensated.

In the above-mentioned modulation processing, the serial sound signal $LR_D$ is modulated into the rectangular waves which are comprised of the pulses $PL_0$ having the period T and pulses $PL_1$ having the period T/2. But, another periods excluding T and T/2 are also available. Any combination of the periods are available as long as the periods of the pulses $PL_0$, $PL_1$ are different from each other. In the above-mentioned embodiment, the attenuation of the attenuation color signals $R_{AT}$, $G_{AT}$, $B_{AT}$ is compensated on the basis of the attenuation of the pulses $PL_0$, $PL_1$ which are arranged in the serial modulation signal $LR_{DM}$. But, it is not necessary to always compensate the attenuation by the sound signal after modulation processing, but the attenuation of the attenuation color signals $R_{AT}$, $G_{AT}$, $B_{AT}$ may be compensated on the basis of the attenuation of the pulses PL which are arranged in the sound signal before modulation processing, that is, the serial sound signal $LR_D$.

After thus compensating the attenuation of the attenuation color signals $R_{AT}$, $G_{AT}$, $B_{AT}$ by the high frequency band compensation portion for video 61 as shown in FIG. 4, the compensated attenuation color signals $R_{AT}$, $G_{AT}$, $B_{AT}$ are outputted to the synchronous signal separating portion 55 as the color signals R, G, BP.

As mentioned before, the attenuation serial signal $LR_{AT}$ has been inputted into the binarization portion 51, as well as into the attenuation compensating portion 50. The binarization portion 51 is provided with a comparator (not shown), and the comparator arranges the waveform of the inputted attenuation serial signal $LR_{AT}$, and outputs it as the serial modulation signal $LR_{DM}$ to the demodulating portion 52 and the clock regeneration portion 53.

When the serial modulation signal $LR_{DM}$ being inputted, the demodulating portion 52 executes a demodulation processing opposite to the modulation processing in FIG. 5 by converting the serial modulation signal $LR_{DM}$ into the serial sound signal $LR_D$. When demodulating the serial modulation signal $LR_{DM}$, the demodulating portion 52 outputs the serial sound signal $LR_D$ to the sound signal recovering portion 57, as shown in FIG. 3. When the serial sound signal $LR_D$ being inputted, the sound signal recovering portion 57 specifies the polarity information PI and the positions of the right and left sound data $SD_L$, $SD_R$ on the basis of the specific pattern which is added to the non-sound data area NDA of the serial sound signal $LR_D$, and separates the polarity information PI from the non-sound data area NDA on the basis of the positions of the specified polarity information PI, and outputs the separated polarity information PI to the synchronous signal recovering portion 56.

When the B signal $B_P$ being inputted, the synchronous signal separating portion 55 separates the synchronous signals HD, VD from the B signal $B_P$, and outputs the separated synchronous signals HD, VD polarities of which are negative to the synchronous signal recovering portion 56.

The synchronous signal recovering portion 56 thus recovers the synchronous signals HD, VD which were inputted into the signal transmitter 2 on the basis of the synchronous signals HD, VD having negative polarity received from the synchronous signal separating portion 55, according to the polarity information PI received from the sound signal recovering portion 57. If the polarity information PI is "1" for instance, the polarity is positive, and the polarities of the synchronous signals HD, VD are reversed. If the polarity information PI is "0" on the contrary, the polarity is negative, and the polarities of the synchronous signals HD, VD are not reversed.

Figure 7:
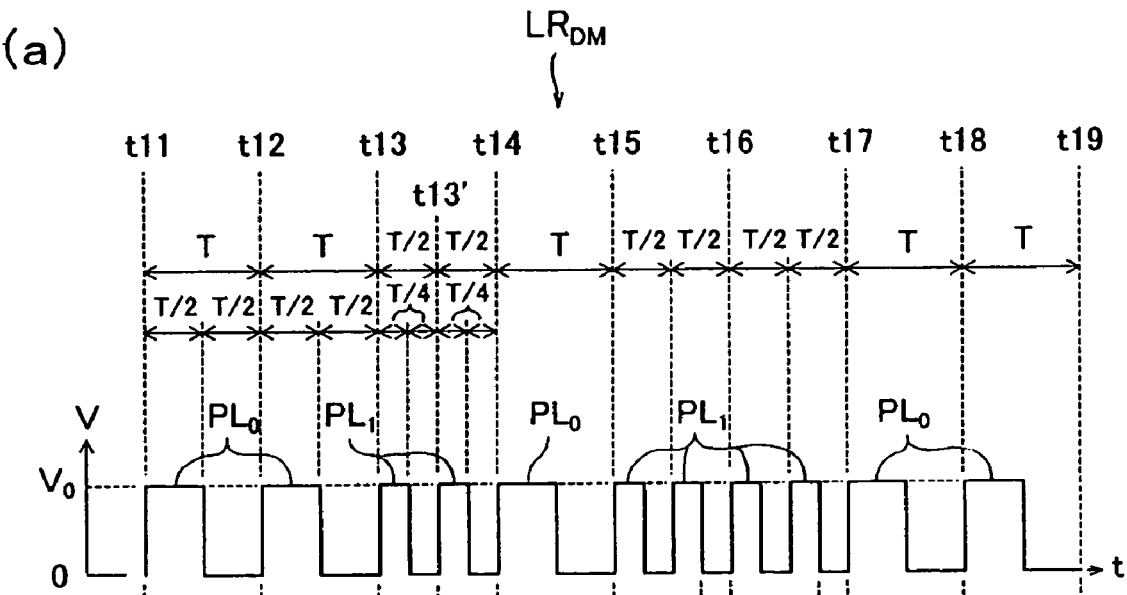
FIG. 7 is a view for explaining a regeneration processing of clock pulses, wherein (a) is a time chart showing a serial modulation signal, and (b) is a time chart showing a clock pulse regeneration signal based on the serial modulation signal as shown in (a).
Figure 7:
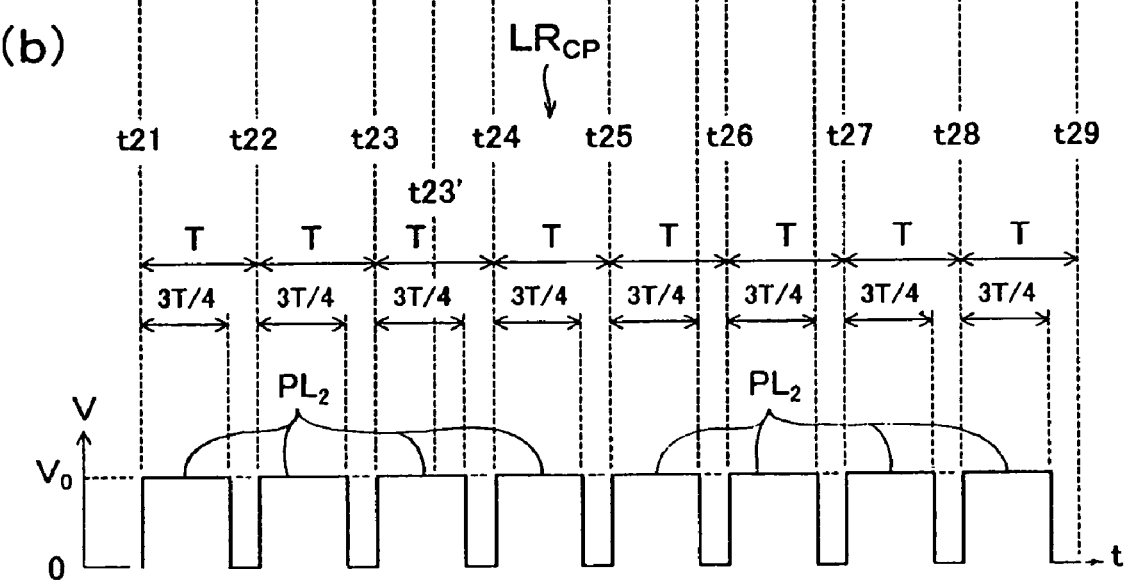

When the serial modulation signal $LR_{DM}$ being inputted, the clock regeneration portion 53 regenerates the clock pulse on the basis of the serial modulation signal $LR_{DM}$. A regeneration processing of clock pulses will now be explained, referring to FIG. 7. FIG. 7 is a view for explaining a regeneration processing of clock pulses, wherein (a) is a time chart showing the serial modulation signal $LR_{DM}$, and (b) is a time chart showing a clock pulse regeneration signal based on the serial modulation signal $LR_{DM}$ as shown in (a).

The clock regeneration portion 53 is provided with a one-shot multivibrator (mono-stable multivibrator) (not shown) which outputs pulse $PL_2$ having the pulse width "3T/4" if a trigger pulse is inputted.

If the serial modulation signal $LR_{DM}$ is inputted into the clock regeneration portion 53 from the left hand of FIG. 7(a) (from a point of time t11), the clock regeneration portion 53 outputs the pulse $PL_2$ at a point of time t21 by judging the pulse $PL_0$ from the point of time t11 to be input of the trigger pulse as shown in FIG. 7(b). That is, the pulse width of the pulse $PL_0$ from the point of time t11 is extended from T/2 into 3T/4. This is similar if the pulse $PL_0$ from the point of time t12 is inputted into the clock regeneration portion 53 at a point of time t22 If the pulse $PL_1$ from a point of time t13 is inputted into the clock regeneration portion 53 at a point of time t23, the clock regeneration portion 53 outputs the pulse $PL_2$ by judging input of the trigger pulse in a similar way. At this time, the pulse $PL_1$ from a point of time t13' is inputted into the clock regeneration portion 53 at a point of time t23'. Since the pulse $PL_2$ has already been outputted from the point of time t23, the pulses $PL_1$ from the points of time t13, t13' are included in the pulse $PL_2$. In similar ways, the clock regeneration portion 53 periodically arranges the pulses $PL_2$ according to the pulses $PL_0$, $PL_1$.

The clock regeneration portion 53 thus produces the signal wherein the periodic pulses $PL_2$ are arranged ("clock pulse regeneration signal $LR_{CP}$") irrespective of the respective numbers of the pulses $PL_0$, $PL_1$ of the serial modulation signal $LR_{DM}$.

And, the clock regeneration portion 53 is provided with a PLL (phase-locked loop) (not shown). When generating the clock pulse regeneration signal $LR_{CP}$, the PLL multiplies the frequency of the produced clock pulse regeneration signal $LR_{CP}$ by integral number so as to regenerate the clock pulse ("regenerated clock pulse $CP_{RB}$") having the frequency the same as the clock pulse CP (e.g. 11.3 MHz) generated by the clock generating portion 42 of the signal transmitter 2. The clock regeneration portion 53 thus outputs the regenerated clock pulse $CP_{RB}$ to the sound signal recovering portion 57.

The above-mentioned embodiment refers to the regeneration processing of the clock pulse with the one-shot multivibrator. But, it is not necessary to always use the one-shot multivibrator as long as the pulses having a constant period are produced on the basis of the serial modulation signal $LR_{DM}$.

When the regenerated clock pulse $CP_{RB}$ being inputted from the clock regeneration portion 53, the sound signal recovering portion 57 divides the frequency of the regenerated clock pulse $CP_{RB}$ (e.g. into 1/256). Since the right and left sound data $SD_L$, $SD_R$ of the serial sound signal $LR_D$ which was inputted into the sound signal recovering portion 57 are specified in the arranged positions, the sound signal recovering portion 57 converts the inputted serial sound signal $LR_D$ into parallel with the divided frequency of the regenerated clock pulse $CP_{RB}$ as the sampling frequency (e.g. 44.1 kHz), and outputs the right and left digital sound signals $L_D$, $R_D$ to the DA converting portion 58. When the right and left digital sound signals $L_D$, $R_D$ being inputted, the digital sound signals $L_D$, $R_D$ are converted into the analog sound signals $L_A$, $R_A$ by the DA converting portion 58.

When transmitting electric signals though a cable, phase shift generates according to the cable length. So, phase shift generates with respect to the clock pulse CP of the signal transmitter 2 on the serial modulation signal $LR_{DM}$ which was transmitted through the signal line 5D according to the length of the signal line 5D.

In this case, the phase shift generates on the serial modulation signal $LR_{DM}$ even if the clock pulse having the frequency the same as the clock pulse CP of the signal transmitter 2 is generated at the signal receiver 3. Therefore, a part of the sound data SD may be lacked when it is not possible to synchronize with the clock pulses generated at the signal receiver 3, or due to passage of time with minimal phase shift even if synchronization is received. In order to regenerate the analog sound signals $L_A$, $R_A$ into original ones, then, it is necessary to interpolate lacked data in a conventional method.

The phase shift generates on the regenerated clock pulse $CP_{RB}$ which was regenerated by the clock regeneration portion 53 with respect to the clock pulse CP of the signal transmitter 2 since the original signal of the regenerated clock pulse $CP_{RB}$ is the serial modulation signal $LR_{DM}$ which was transmitted through the signal line 5D. But, the volumes of phase shifts of both signals $CP_{RB}$, $LR_{DM}$ with respect to the clock pulse CP of the signal transmitter 2 are the same as each other since both signals are generated on the basis of the clock pulses CP generated by the same OSC (quartz oscillator)

Then, phase shift does not generate on the serial modulation signal $LR_{DM}$ which was transferred through the signal line 5D with respect to the regenerated clock pulse $CP_{RB}$, so that it is possible to synchronize the serial modulation signal $LR_{DM}$ with the regenerated clock pulse $CP_{RB}$, and the analog sound signals $L_A$, $R_A$ can be regenerated into original ones by converting the sound data SD of the serial modulation signal $LR_{DM}$ into the analog sound signals $L_A$, $R_A$ without fail without interpolating lacked data.

After the DA converting portion 58 thus converts the digital sound signals $L_D$, $R_D$ into analog ones, the synchronous signal separating portion 55 outputs the R signal R, the G signal G, and the B signal $B_P$ from which the synchronous signals HD, VD were separated, that is, the B signal B, to the R output terminal 32R, the G output terminal 32G, and the B output terminal 32B of the output terminal for BNC cable 32 of the signal receiver 3. The synchronous signal recovering portion 56 respectively outputs the recovered horizontal synchronous signal HD and the vertical synchronous signal VD to the HD output terminal 32H and the VD output terminal 32V of the output terminal for BNC cable 32. And, the DA converting portion 58 respectively outputs the analog sound signals $L_A$, $R_A$ to the left sound output terminal 33L and the right sound output terminal 33R of the sound output terminal 33.

As shown in FIG. 1, the color signals R, G, B and the synchronous signals HD, VD are inputted into the plasma display 10 through the BNC cable 6B and the analog sound signals $L_A$, $R_A$ are inputted into the plasma display 10 through the RCA cable 7B. As mentioned before, the color signals R, G, B attenuations of which have been compensated are inputted into the plasma display 10, so that good videos having no blur nor halation are displayed on the plasma display 10, and sounds are outputted from the plasma display 10 as well as display of the videos The cable extension unit 1 according to the invention compensates the attenuation of video signals by utilizing sound signals converted into digital signals as signals for compensation. Therefore, the rectangular wave the waveform of which is determined can be stably transmitted to the signal receiver 3, and the attenuation of the attenuation color signals $R_{AT}$, $G_{AT}$, $B_{AT}$ can be correctly compensated irrespective of resolutions of images or kinds of displays.

The sound signals can be transmitted to the signal receiver 3 while stably compensating the video signals, so that effective presentation can be actualized by outputting good videos and sounds to the video output machine. Besides, the analog sound signals $L_A$, $R_A$ are regenerated into the original ones on the basis of the regenerated clock pulse $CP_{RB}$, thereby outputting good sounds.

Since it is not necessary to transmit the signals for compensation separately from the video signals, the attenuation of the video signals can be compensated with the cable having relatively small number of signal lines while transmitting sound signals to the signal receiver 3, thereby simplifying the structure of the cable extension unit 1.

INDUSTRIAL APPLICABILITY

The invention can be utilized as a cable extension unit to be arranged at both ends of the cable when transferring video signals through the cable to a video output machine which is away from a video input source.

The invention claimed is:

1. A cable extension unit having a signal transmitter for inputting video signals therein, and a signal receiver being freely connecting with said signal transmitter through signal lines, for outputting said video signals received from said signal transmitter through said signal lines, comprising:
   said signal transmitter comprising:
      sound signal receiving means for receiving input of a sound signal; and
      digital sound signal transmitting means for outputting said sound signal inputted into said sound signal receiving means to said signal receiver through said signal lines as a digital sound signal wherein pulses of digital data are arranged;
   said signal receiver comprising:
      attenuation compensation volume computing means for computing attenuation compensation volume of said video signal which receives from said signal transmitter on the basis of attenuation of pulses which are arranged in said digital sound signal received from said signal transmitter; and
      video signal attenuation compensation means for compensating attenuation of said video signal received from said signal transmitter on the basis of said attenuation compensation volume computed by said attenuation compensation volume computing means.

2. The cable extension unit according to claim 1, wherein said signal receiver has frequency band separating means for separating said pulse which is arranged in said digital sound signal received from said signal transmitter into a plurality of frequency bands, and said attenuation compensation volume computing means of said signal receiver has means for computing compensation volume for each frequency band for computing said attenuation compensation volume for each frequency band on the basis of said attenuation of each said pulse which have been separated into a plurality of said frequency bands by said frequency band separating means, and said video signal attenuation compensating means of said signal receiver has means for compensating video signal for each frequency band for compensating said attenuation of said video signal which was received from said signal transmitter for each said frequency band on the basis of said attenuation compensation volume for each said frequency band which was computed by said means for computing compensation volume for each frequency band.

3. The cable extension unit according to claim 1, wherein said pulses which are arranged in said digital sound signal which said digital sound signal transmitting means outputs are rectangular waves.

4. The cable extension unit according to claim 1, wherein said signal transmitter has digital sound signal converting means for converting said digital sound signal, which said digital sound signal transmitting means of said signal transmitter outputs, into a digital modulation signal wherein pulses having frequencies corresponding to each digital data of said digital sound signal are arranged, and said digital sound signal transmitting means of said signal transmitter outputs said digital modulation signal to said signal receiver through said signal lines, and said attenuation compensation volume computing means of said signal receiver computes said attenuation compensation volume of said video signal received from said signal transmitter on the basis of said attenuation of pulses which are arranged in said digital modulation signal received from said signal transmitter.

5. The cable extension unit according to claim 4, wherein said signal receiver has frequency band separating means for separating said pulse which is arranged in said digital modulation signal received from said signal transmitter into a plurality of frequency bands, and said attenuation compensation volume computing means of said signal receiver has means for computing compensation volume for each frequency band for computing said attenuation compensation volume for each frequency band on the basis of said attenuation of each said pulse which have been separated into a plurality of said frequency bands by said frequency band separating means, and said video signal attenuation compensating means of said signal receiver has means for compensating video signal for each frequency band for compensating said attenuation of said video signal which was received from said signal transmitter for each said frequency band on the basis of said attenuation compensation volume for each said frequency band which was computed by said means for computing compensation volume for each frequency band.

6. The cable extension unit according to claim 4, wherein said pulses which are arranged in said digital modulation signal which said digital sound signal transmitting means outputs are rectangular waves.

* * * * *